United States Patent
Yang et al.

(10) Patent No.: US 9,426,801 B2
(45) Date of Patent: Aug. 23, 2016

(54) METHOD AND APPARATUS FOR TRANSCEIVING CONTROL SIGNAL

(71) Applicant: LG ELECTRONICS INC., Seoul (KR)

(72) Inventors: Suckchel Yang, Anyang-si (KR); Yunjung Yi, Anyang-si (KR); Jonghyun Park, Anyang-si (KR); Joonkui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/406,713

(22) PCT Filed: Jul. 8, 2013

(86) PCT No.: PCT/KR2013/006043
§ 371 (c)(1),
(2) Date: Dec. 9, 2014

(87) PCT Pub. No.: WO2014/007593
PCT Pub. Date: Jan. 9, 2014

(65) Prior Publication Data
US 2015/0189627 A1   Jul. 2, 2015

Related U.S. Application Data

(60) Provisional application No. 61/668,464, filed on Jul. 6, 2012, provisional application No. 61/731,451, filed on Nov. 29, 2012.

(51) Int. Cl.
*H04W 4/00* (2009.01)
*H04W 72/04* (2009.01)
*H04W 52/02* (2009.01)
*H04L 5/00* (2006.01)
*H04L 5/14* (2006.01)

(52) U.S. Cl.
CPC ............ *H04W 72/042* (2013.01); *H04L 5/0098* (2013.01); *H04L 5/14* (2013.01); *H04W 52/0206* (2013.01); *H04L 5/1469* (2013.01)

(58) Field of Classification Search
None
See application file for complete search history.

(56) References Cited

U.S. PATENT DOCUMENTS

2011/0134774 A1* 6/2011 Pelletier .............. H04W 52/365
                                                     370/252
2011/0292854 A1* 12/2011 Terry ...................... H04L 5/001
                                                     370/311

(Continued)

FOREIGN PATENT DOCUMENTS

WO   2012/023839   2/2012

OTHER PUBLICATIONS

PCT International Application No. PCT/KR2013/006043, Written Opinion of the International Searching Authority dated Oct. 18, 2013, 15 pages.

(Continued)

*Primary Examiner* — Anh-Vu Ly
(74) *Attorney, Agent, or Firm* — Lee, Hong, Degerman, Kang & Waimey

(57) ABSTRACT

A method and apparatus for receiving a control signal in a wireless communication system in which a plurality of cells are merged. The method includes: receiving a signal indicating a deactivation of at least one cell from among the plurality of cells; and deactivating the at least one cell. The deactivation-indicating signal indicates the deactivation of the at least one cell to all of a plurality of user equipments configured to merge the at least one cell.

11 Claims, 16 Drawing Sheets

(56) References Cited

U.S. PATENT DOCUMENTS

| | | | |
|---|---|---|---|
| 2012/0082107 A1 | 4/2012 | Ou et al. | |
| 2013/0188473 A1* | 7/2013 | Dinan | H04W 56/0005 370/216 |
| 2013/0201834 A1* | 8/2013 | Klingenbrunn | H04W 28/12 370/236 |
| 2013/0272235 A1* | 10/2013 | Tseng | H04W 56/0005 370/329 |
| 2014/0185595 A1* | 7/2014 | Wu | H04W 56/00 370/336 |
| 2014/0198729 A1* | 7/2014 | Bostrom | H04W 24/10 370/328 |
| 2015/0148050 A1* | 5/2015 | Siomina | H04J 11/005 455/452.1 |

OTHER PUBLICATIONS

Ericsson, "Introduction of CA Enhancements in MAC," 3GPP TSG-RAN2 Meeting #78, R2-123091, May 2012, 13 pages.

ASUSTeK, "Handling of deactivation timer for multiple TA," 3GPP TSG-RAN WG2 Meeting #77, R2-120154, Feb. 2012, 3 pages.

Itri, "Deactivation of Timing Reference SCell in sTAG," 3GPP TSG-RAN WG2 Meeting#77bis, Tdoc R2-121530, Mar. 2012, 3 pages.

PCT International Application No. PCT/KR2013/006043, Written Opinion of the International Searching Authority dated Oct. 18, 2013, 12 pages.

\* cited by examiner

METHOD AND APPARATUS FOR TRANSCEIVING CONTROL SIGNAL

CROSS-REFERENCE TO RELATED APPLICATIONS

This application is the National Stage filing under 35 U.S.C. 371 of International Application No. PCT/KR2013/006043, filed on Jul. 8, 2013, which claims the benefit of U.S. Provisional Application Ser. No. 61/668,464, filed on Jul. 6, 2012 an 61/731,451, filed on Nov. 29, 2012, the contents of which are all hereby incorporated by reference herein in their entirety.

TECHNICAL FIELD

The present invention relates to a wireless communication system, and more particularly, to a method and apparatus for efficiently transmitting and receiving a signal of activating/deactivating a specific cell in a wireless communication system.

BACKGROUND ART

Recently, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system, MC-FDMA (multi carrier frequency division multiple access) system and the like. In a wireless communication system, a user equipment receives information from a base station in downlink (hereinafter abbreviated DL) and the user equipment can transmit information to the base station in uplink (hereinafter abbreviated UL). The information transmitted or received by the user equipment includes data and various control information. There exist various physical channels according to a type and a usage of the information transmitted or received by the user equipment.

DISCLOSURE OF THE INVENTION

Technical Task

One object of the present invention is to provide a method of efficiently transmitting/receiving a control signal in a wireless communication system and an apparatus therefor.

Another object of the present invention is to provide a method of efficiently activating/deactivating a specific cell in a wireless communication system in which a plurality of cells are carrier-aggregated and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, provided herein is a method for receiving a control signal by a user equipment (UE) in a wireless communication system in which a plurality of cells are aggregated, the method comprising receiving a signal indicating deactivation of at least one cell among the plurality of the cells; and deactivating the at least one cell, wherein the signal indicating the deactivation may commonly indicate the deactivation of the at least one cell to a plurality of UEs configured to aggregate the at least one cell.

Preferably, the receiving the signal indicating the deactivation may include detecting a physical downlink control channel (PDCCH) scrambled with a radio network temporary identifier (RNTI) common to the plurality of UEs, and the signal indicating the deactivation may be received via the PDCCH.

Preferably, the receiving the deactivation signal may include detecting a PDCCH scrambled with a radio network temporary identifier (RNTI) common to the plurality of UEs and receiving a physical downlink shared channel (PDSCH) scheduled by the PDCCH, and the signal indicating the deactivation may be received via the PDSCH.

Preferably, when the signal indicating the deactivation is received on a primary cell other than the at least one cell, the signal indicating the deactivation may include a cell identifier (ID) value, and when the signal indicating the deactivation is received on each of the at least one cell, the signal indicating the deactivation may not include cell identification information.

Preferably, the deactivating the at least one cell may include stopping transmission of a sounding reference signal (SRS) on the at least one cell, stopping transmission of channel quality information (CQI), precoding matrix index (PMI) information, rank indicator (RI) information, and precoding type indicator (PTI) for the at least one cell, stopping monitoring of a PDCCH on the at least one cell and/or for the at least one cell, stopping monitoring of a PDSCH on the at least one cell, and stopping radio resource management (RRM) measurement for the at least one cell.

Preferably, when the wireless communication system is a frequency division duplex (FDD) system, the deactivating the at least one cell may include stopping an operation related to uplink signal transmission via an uplink carrier included in each of the at least one cell or stopping an operation related to downlink signal reception via a downlink carrier.

Preferably, when the wireless communication system is a time division duplex (TDD) system, the deactivating the at least one cell may include stopping an operation related to uplink signal transmission in an uplink subframe included in each of the at least one cell or stopping an operation related to downlink signal reception in a downlink subframe.

Preferably, the signal indicating the deactivation may include a cell-specific message or a UE group-specific message.

In another aspect of the present invention, provided herein is a use equipment (UE) for receiving a control signal in a wireless communication system in which a plurality of cells are aggregated, the UE comprising: a radio frequency (RF) unit; and a processor, the processor configured to receive a signal indicating deactivation of at least one cell among the plurality of cells through the RF unit, and deactivate the at least one cell, wherein the signal indicating the deactivation may commonly indicate the deactivation of the at least one cell to a plurality of UEs configured to aggregate the at least one cell.

Preferably, the receiving the signal indicating the deactivation may include detecting a physical downlink control channel (PDCCH) scrambled with a radio network temporary identifier (RNTI) common to the plurality of UEs, and the signal indicating the deactivation may be received via the PDCCH.

Preferably, the receiving the deactivation signal may include detecting a PDCCH scrambled with a radio network temporary identifier (RNTI) common to the plurality of UEs and receiving a physical downlink shared channel (PDSCH) scheduled by the PDCCH, and the signal indicating the deactivation may be received via the PDSCH.

Preferably, when the signal indicating the deactivation is received on a primary cell other than the at least one cell, the signal indicating the deactivation may include a cell identifier (ID) value, and when the signal indicating the deactivation is received on each of the at least one cell, the signal indicating the deactivation may not include cell identification information.

Preferably, the deactivating the at least one cell may include stopping transmission of a sounding reference signal (SRS) on the at least one cell, stopping transmission of channel quality information (CQI), precoding matrix index (PMI) information, rank indicator (RI) information, and precoding type indicator (PTI) on the at least one cell, stopping monitoring of a PDCCH on the at least one cell and/or for the at least one cell, stopping monitoring of a PDSCH on the at least one cell, and stopping radio resource management (RRM) measurement for the at least one cell.

Preferably, when the wireless communication system is a frequency division duplex (FDD) system, the deactivating the at least one cell may include stopping an operation related to uplink signal transmission via an uplink carrier included in each of the at least one cell or stopping an operation related to downlink signal reception via a downlink carrier.

Preferably, when the wireless communication system is a time division duplex (TDD) system, the deactivating the at least one cell may include stopping an operation related to uplink signal transmission in a uplink subframe included in each of the at least one cell or stopping an operation related to downlink signal reception in a downlink subframe.

Preferably, the signal indicating the deactivation may include a cell-specific message or a UE group-specific message.

Advantageous Effects

The present invention enables efficiently transmission and reception of a control signal in a wireless communication system.

The present invention enables efficient activation/deactivation of a specific cell in a wireless communication system in which a plurality of cells are carrier-aggregated.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as universal terrestrial radio access (UTRA) or CDMA2000. TDMA can be implemented by wireless communication technologies, for example, global system for mobile communications (GSM), general packet radio service (GPRS), enhanced data rates for GSM evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the universal mobile telecommunications system (UMTS). 3rd generation partnership project (3GPP) long term evolution (LTE) is a part of evolved UMTS (E-UMTS) that uses E-UTRA. The LTE Advanced (LTE-A) is an evolved version of 3GPP LTE. Although the following embodiments of the present invention will hereinafter describe inventive technical characteristics on the basis of the 3GPP LTE(-A) system, it should be noted that the following embodiments will be disclosed only for illustrative purposes and the scope and spirit of the present invention are not limited thereto.

In a wireless communication system, a user equipment receives information from a base station through downlink (DL), and transmits information to the base station through uplink (UL). The information communicated between the user equipment and the base station includes various data and control information. According to the type/usage of the information communicated the user equipment and the base station, there exits various physical channels.

Figure 1:
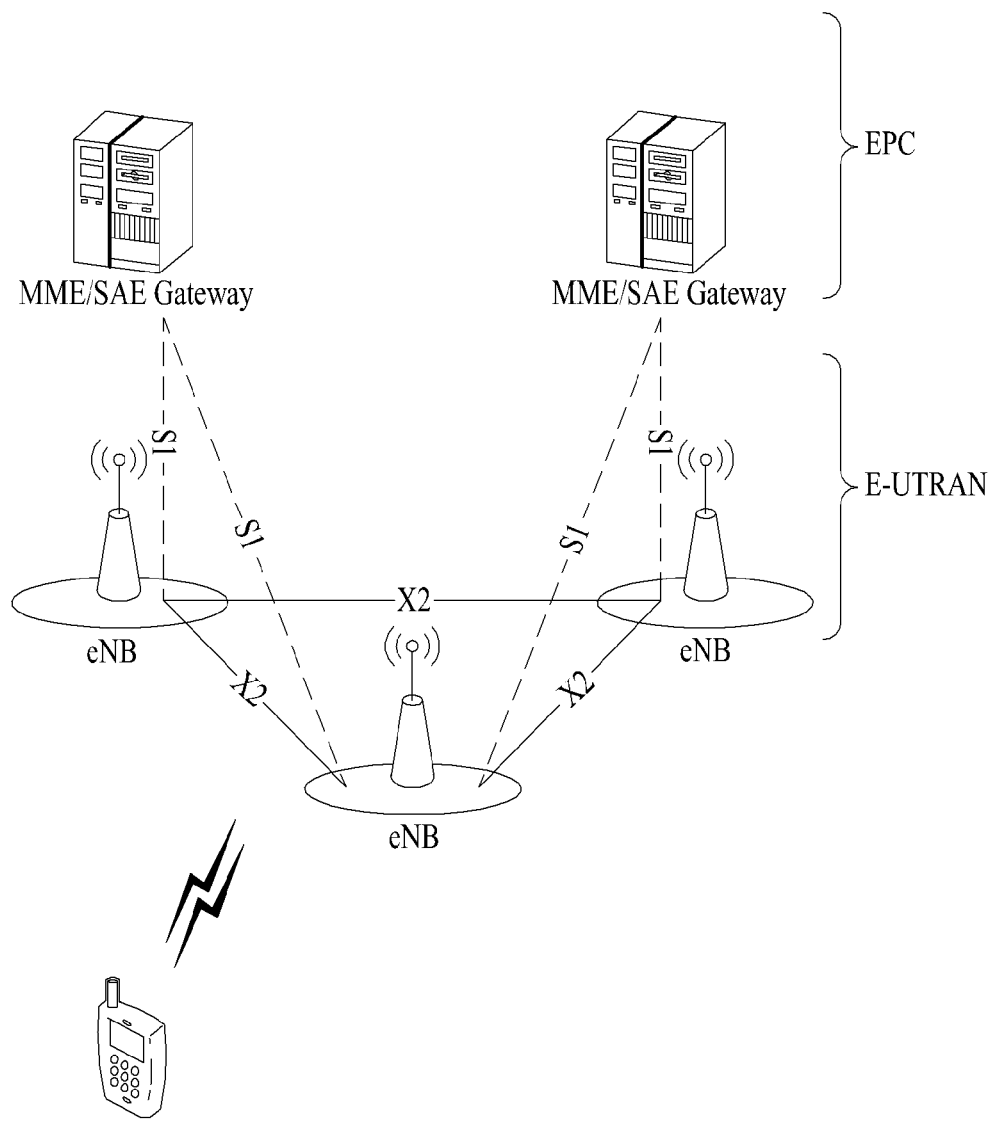
FIG. 1 illustrates an LTE system.

FIG. 1 illustrates an LTE system. The LTE system a mobile communication system evolved from an E-UMTS.

With reference to FIG. 1, the LTE system architecture can be roughly classified into an Evolved UMTS Terrestrial Radio Access Network (E-UTRAN) and an Evolved Packet Core (EPC). The E-UTRAN may include a User Equipment (UE) and an Evolved NodeB (eNB, base station), wherein the connection between UE and the eNB is called a Uu interface, and the connection between eNBs is called an X2 interface. The EPC includes a Mobility Management Entity (MME) performing a control plane function and a Serving Gateway (S-GW) performing a user plane function, wherein the connection between the eNB and the MME is called an S1-MME interface, and the connection between the eNB and the S-GW is called an S1-U interface, and both connections may be commonly called an S1 interface.

Figure 2:
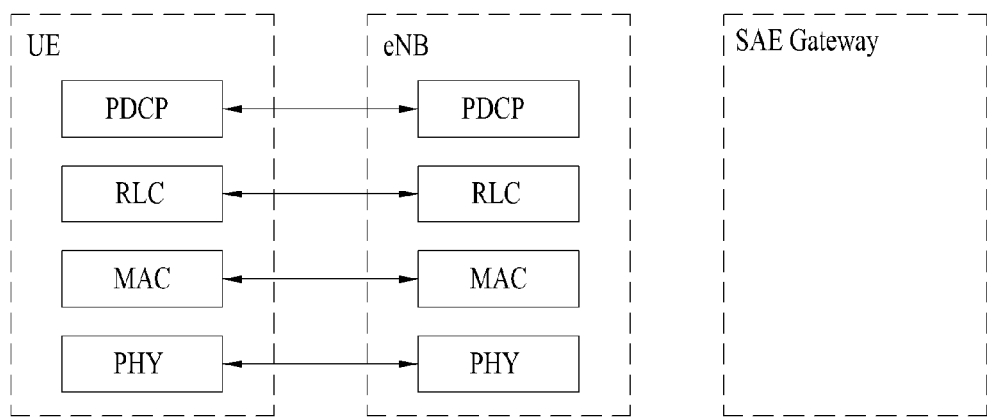
FIGS. 2 and 3 illustrate each layer of a radio protocol.
Figure 3:
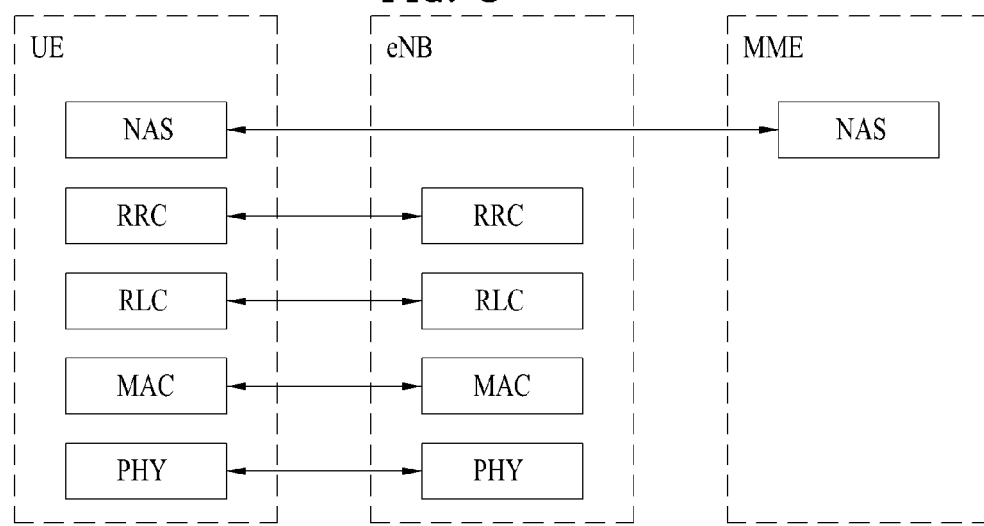

A radio interface protocol is defined in the Uu interface which is a radio section, wherein the radio interface protocol is horizontally comprised of a physical layer, a data link layer, a network layer, and vertically classified into a user plane for user data transmission and a control plane for signaling (control signal) transfer. Such a radio interface protocol can be typically classified into L1 (first layer) including a PHY layer which is a physical layer, L2 (second layer) including MAC/RLC/PDCP layers, and L3 (third layer) including an RRC layer as illustrated in FIGS. 2 and 3, based on the three lower layers of an Open System Interconnection (OSI) reference model widely known in the field of communication systems. Those layers exist as a pair in the UE and E-UTRAN, thereby performing data transmission of the Uu interface.

FIGS. 2 and 3 illustrate each layer of a radio protocol. FIG. 2 illustrates a control plane and FIG. 3 illustrates a user plane.

The physical layer (PHY) which is a first layer provides information transfer services to the upper layers using a physical channel. The PHY layer is connected to the upper MAC layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at transmitter and receiver sides.

Various layers exist in the second layer. First, the MAC layer serves to map various logical channels to various transport channels, and also performs logical channel multiplexing for mapping several logical channels to one transport channel. The MAC layer is connected to an upper RLC layer through a logical channel, and the logical channel is roughly divided into a control channel for transmitting control plane information and a traffic channel for transmitting user plane information according to the type of information to be transmitted.

The RLC layer of the second layer manages segmentation and concatenation of data received from an upper layer to appropriately adjusts a data size such that a lower layer can send data to a radio section. Also, the RLC layer provides three operation modes such as a Transparent Mode (TM), an Un-acknowledged Mode (UM), and an Acknowledged Mode (AM) so as to guarantee various Quality of Services (QoS) required by each Radio Bearer (RB). In particular, AM RLC performs a retransmission function through an ARQ function for reliable data transmission.

A Packet Data Convergence Protocol (PDCP) layer of the second layer performs a header compression function for reducing the size of an IP packet header, which is relatively large in size and contains unnecessary control information to efficiently transmit IP packets, such as IPv4 or IPv6 packets, over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering for preventing the third person's data wiretapping and integrity protection for preventing the third person's data manipulation.

A radio resource control (RRC) layer located at the uppermost portion of the third layer is only defined in the control plane. The RRC layer performs a role of controlling logical channels, transport channels, and physical channels in relation to configuration, re-configuration, and release of RBs. Here, the RB denotes a logical path provided by the first and the second layers for transferring data between the UE and the UTRAN. In general, the configuration of the RB refers to a process of stipulating the characteristics of protocol layers and channels required for providing a specific service, and setting each of the detailed parameter and operation methods thereof. The RB is divided into a Signaling RB (SRB) and a Data RB (DRB), wherein the SRB is used as a path for transmitting RRC messages in the control plane while the DRB is used as a path for transmitting user data in the user plane.

Figure 4:
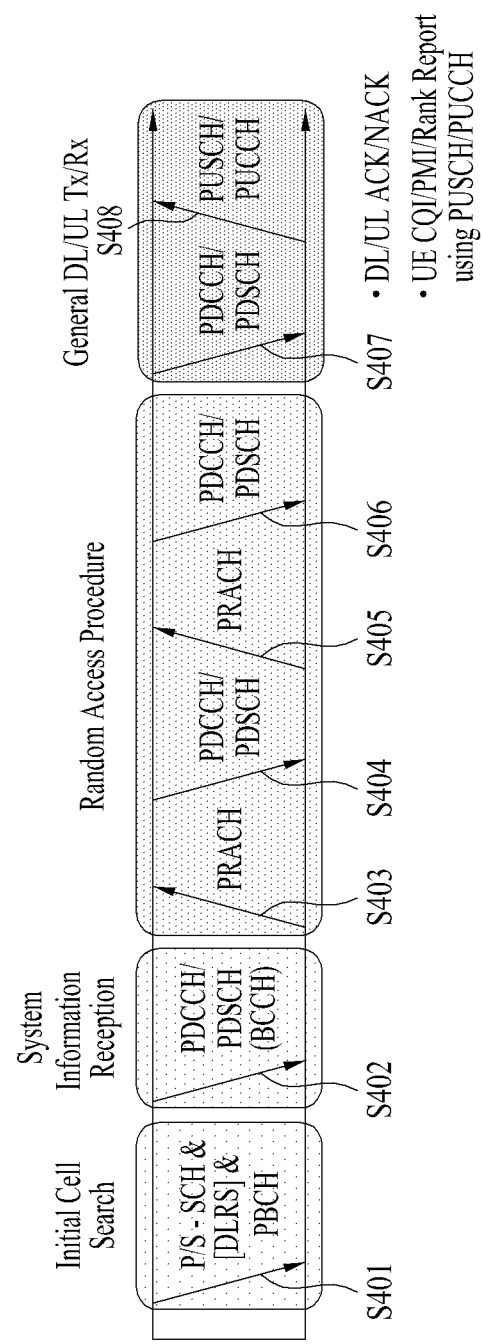
FIG. 4 illustrates physical channels and a general method for transmitting signals on the physical channels in the LTE (-A) system.

FIG. 4 illustrates physical channels and a general method for transmitting signals on the physical channels in the LTE (-A) system.

When a UE is powered on or enters a new cell, the UE performs initial cell search in step S401. The initial cell search involves acquisition of synchronization to an eNB. To this end, the UE synchronizes its timing to the eNB and acquires information such as a cell identifier (ID) by receiving a primary synchronization channel (P-SCH) and a secondary synchronization channel (S-SCH) from the eNB. Then the UE may acquire broadcast information in the cell by receiving a physical broadcast channel (PBCH) from the eNB. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S402.

To complete access to the eNB, the UE may perform a random access procedure such as steps S403 to S406 with the eNB. To this end, the UE may transmit a preamble on a physical random access channel (PRACH) (S403) and may receive a response message to the preamble on a PDCCH and a PDSCH associated with the PDCCH (S404). In the case of a contention-based random access, the UE may additionally perform a contention resolution procedure including transmission of an additional PRACH (S405) and reception of a PDCCH signal and a PDSCH signal corresponding to the PDCCH signal (S406).

After the above procedure, the UE may receive a PDCCH and/or a PDSCH from the eNB (S407) and transmit a physical uplink shared channel (PUSCH) and/or a physical uplink control channel (PUCCH) to the eNB (S408), in a general UL/DL signal transmission procedure. Information that the UE transmits to the eNB is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 5:
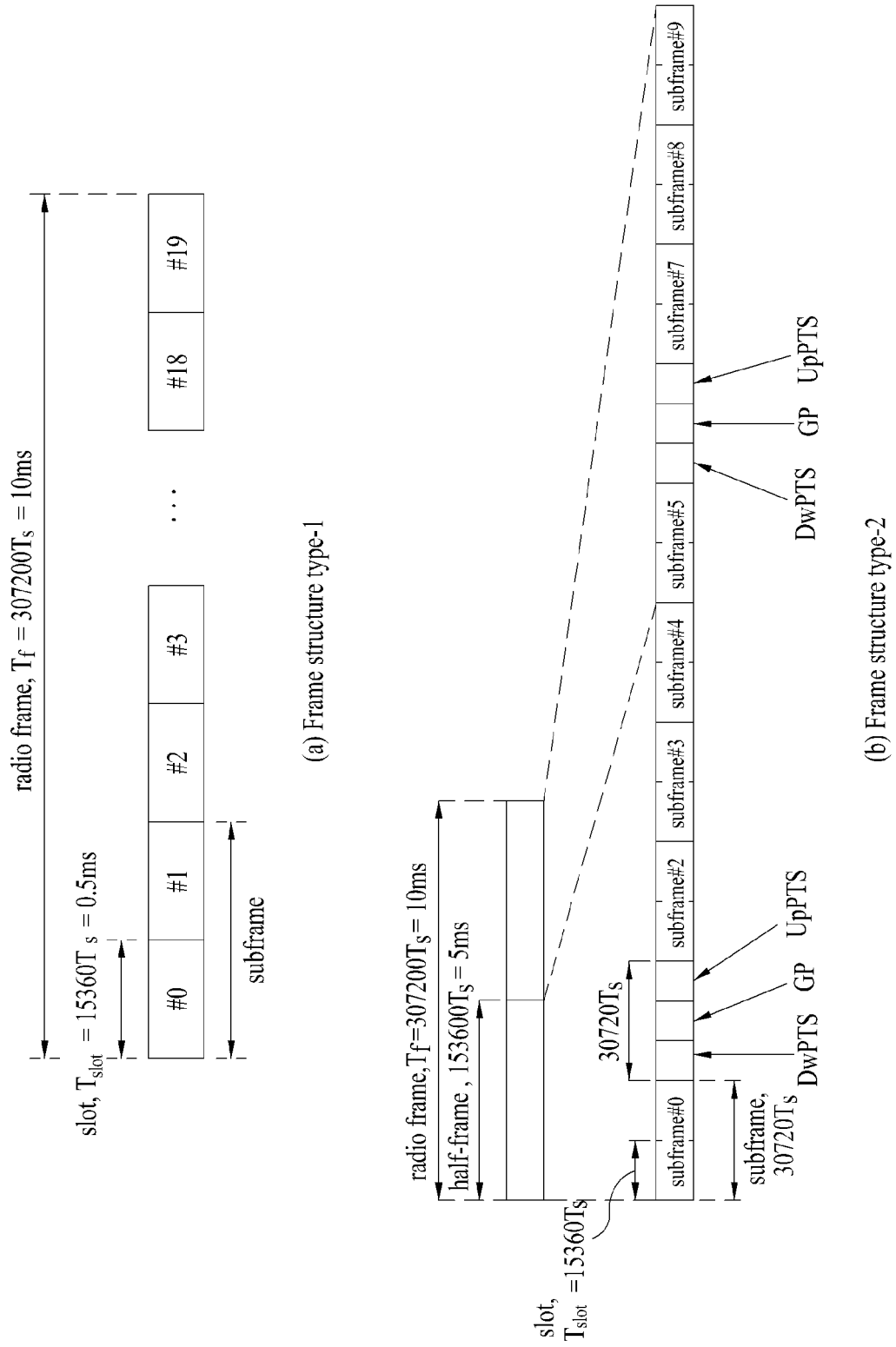
FIG. 5 illustrates a structure of a radio frame used in an LTE(-A) system.

FIG. 5 illustrates a structure of a radio frame used in an LTE(-A) system. In a cellular OFDM radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 5(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDMA is used in downlink, an OFDM symbol indicates one symbol period. The OFDM symbol may be referred to as an SC-FDMA symbol or symbol period. A RB as a resource assignment unit may include a plurality of consecutive subcarriers in one slot.

The number of OFDM symbols included in one slot may be changed according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of first two or three OFDM symbols of each subframe may be assigned to a physical downlink control channel (PDCCH) and the remaining OFDM symbols may be assigned to a physical downlink shared channel (PDSCH).

FIG. 5(b) shows the structure of the type-2 radio frame. The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a BS and uplink transmission synchronization of a UE. For example, the uplink slot (e.g., UpPTS) may be used to transmit a sounding reference signal (SRS) for channel estimation in an eNB and to transmit a physical random access channel (PRACH) that carriers a random access preamble for uplink transmission synchronization. The GP is used to eliminate interference generated in uplink due to multi-path delay of a downlink signal between uplink and downlink. Table 1 below shows an uplink (UL)-downlink (DL) configuration in subframes in a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a DL subframe, U represents a UL subframe, and S represents a special subframe. The special subframe includes a downlink pilot timeslot (DwPTS), a guard period (GP), and an uplink pilot timeslot (UpPTS). Table 2 below shows a special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The above-described radio frame structure is purely exemplary and thus the number of subframes in a radio frame, the number of slots in a subframe, or the number of symbols in a slot may vary in different ways.

Figure 6:
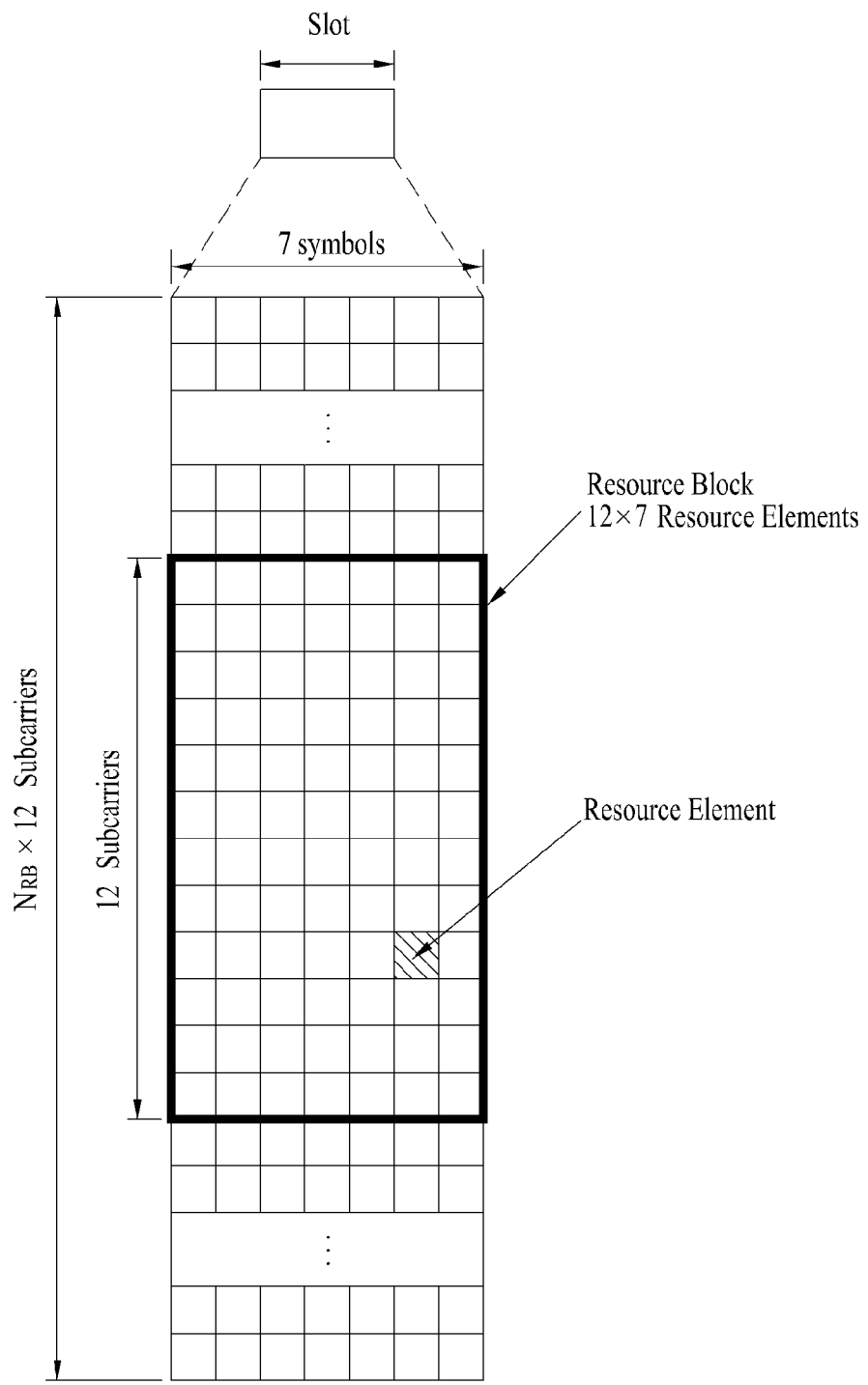
FIG. 6 illustrates a resource grid of one DL slot used in an LTE(-A) system.

FIG. 6 illustrates a resource grid of one DL slot used in an LTE(-A) system.

Referring to FIG. 6, a DL slot includes a plurality of OFDM symbols in the time domain. One DL slot may include 7 OFDM symbols and a resource block (RB) may include 12 subcarriers in the frequency domain. However, the present invention is not limited thereto. Each element of the resource grid is referred to as a Resource Element (RE). An RB includes 12×7 REs. The number of RBs in a DL slot, $N^{DL}$ depends on a DL transmission bandwidth. A UL slot may have the same structure as a DL slot.

Figure 7:
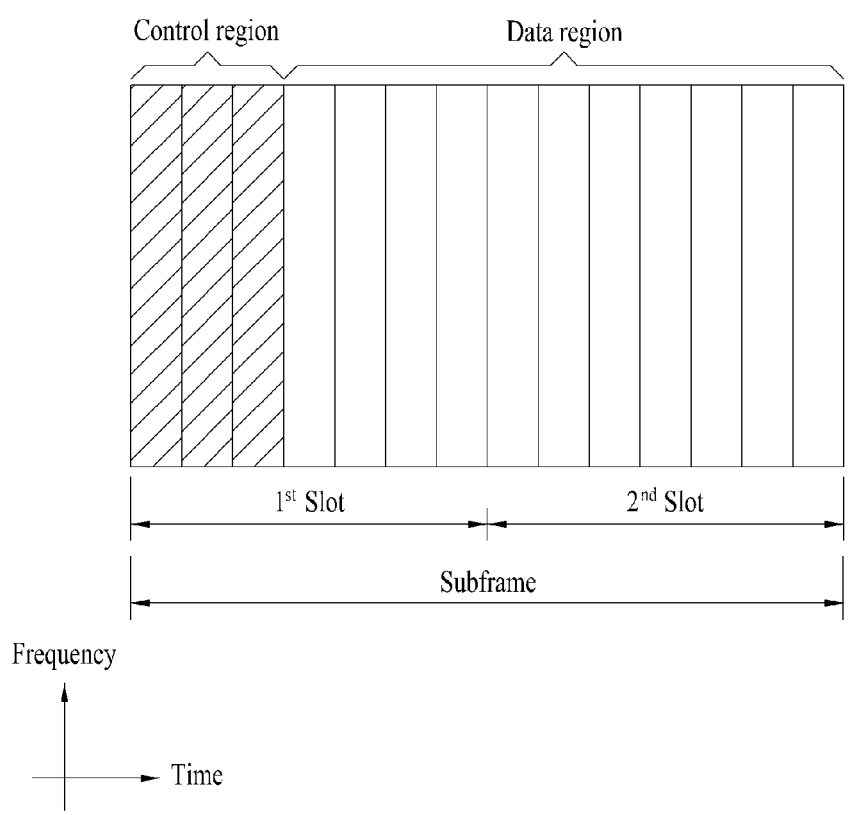
FIG. 7 illustrates a downlink subframe structure used in the LTE(-A) system.

FIG. 7 illustrates a downlink subframe structure used in the LTE(-A) system.

Referring to FIG. 7, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

Figure 8:
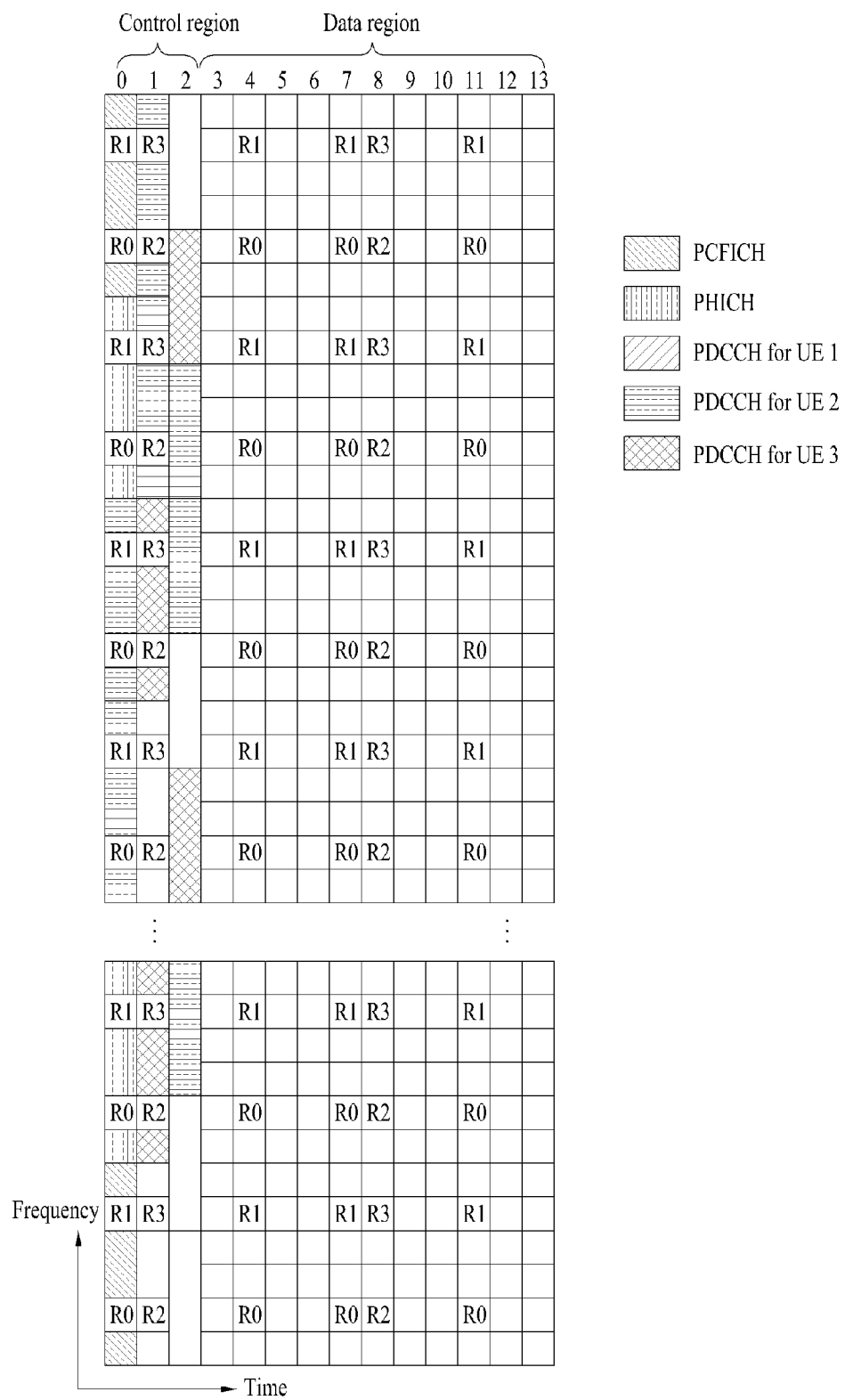
FIG. 8 illustrates a control channel allocated to a downlink subframe.

FIG. 8 illustrates a control channel allocated to a downlink subframe. In FIG. 8, R1 to R4 denote a cell-specific reference signal (CRS) or a cell-common reference signal for antenna ports 0 to 3. The CRS is transmitted in all bands every subframe and fixed in a predetermined pattern in a subframe. The CRS is used to channel measurement and downlink signal demodulation.

Referring to FIG. 8, the PCFICH is transmitted at a first OFDM symbol of a subframe and carries information regarding the number of OFDM symbols used for transmission of control channels within the subframe. The PCFICH is composed of four REGs that are uniformly distributed in a control region based on a cell ID. The PCFICH indicates a value of 1 to 3 (or 2 to 4) and is modulated via quadrature phase shift keying (QPSK). The PHICH is a response of uplink transmission and carries an HARQ acknowledgment (ACK)/negative-acknowledgment (NACK) signal. The PHICH except for CRS and PCFICH (a first OFDM symbol) is allocated on the remaining REGs in one or more OFDM symbols configured by PHICH duration. The PHICH is allocated to three REGs that are distributed if possible on the frequency domain.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). DCI format is defined as formats 0, 3, 3A, and 4 for uplink and defined as formats 1, 1A, 1B, 1C, 1D, 2, 2A, 2B, 2C, and 2D for downlink. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A plurality of PDCCHs may be transmitted in one subframe. Each PDCCH is transmitted using one or more control channel elements (CCEs) and each CCE corresponds to nine sets of four resource elements. The four resource elements are referred to as a resource element group (REG). Four QPSK symbols are mapped to one REG A resource element allocated to a reference signal is not included in an REG and thus a total number of REGs in a given OFDM symbol varies according to whether a cell-specific reference signal is present.

Table 3 shows the number of CCEs, the number of REGs, and the number of PDCCH bits according to PDCCH format.

TABLE 3

| PDCCH format | Number of CCE (n) | Number of REG | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the SS has different sizes according to each PDCCH format. In addition, a UE-specific SS and a common SS are separately defined. The BS does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in an SS is referred to as blind decoding (blind detection). Through blind decoding, the UE simultaneously performs identification of the PDCCH transmitted to the UE and decoding of the control information transmitted through the corresponding PDCCH. For example, in the case where the PDCCH is demasked using the C-RNTI, the UE detects its own PDCCH if a CRC error is not detected. The USS is separately configured for each UE and a scope of CSSs is known to all UEs. The USS and the CSS may be overlapped with each other. When a significantly small SS is present, if some CCE positions are allocated in an SS for a specific UE, the remaining CCEs are not present. Thus a BS may not find CCE resources in which the PDCCH is to be transmitted to all available UEs in a given subframe. In order to minimize the possibility that such blocking is subsequent to a next subframe, a start position of the USS is UE-specifically hopped.

Table 4 shows sizes of CSS and USS.

TABLE 4

| PDCCH format | Number of CCE (n) | Number of candidates in CSS | Number of candidates in USS |
|---|---|---|---|
| 0 | 1 | — | 6 |
| 1 | 2 | — | 6 |
| 2 | 4 | 4 | 2 |
| 3 | 8 | 2 | 2 |

Figure 9:
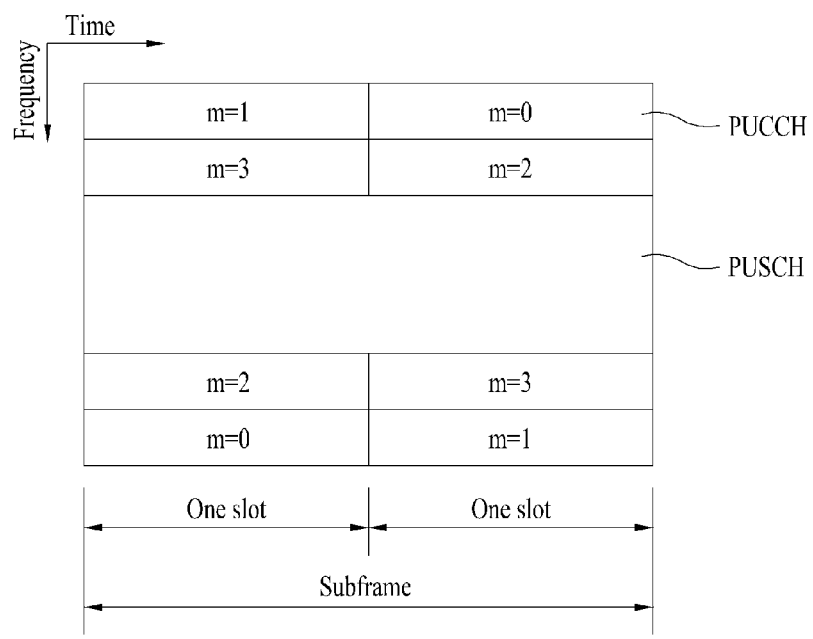
FIG. 9 illustrates a structure of a UL subframe in the LTE(-A) system.

FIG. 9 illustrates a structure of a UL subframe in the LTE(-A) system.

Referring to FIG. 9, a UL subframe includes a plurality of (e.g. 2) slots. A slot may include a different number of SC-FDMA symbols according to a CP length. The UL subframe is divided into a control region and a data region in the frequency domain. The data region includes a PUSCH to transmit a data signal such as voice and the control region includes a PUCCH to transmit UCI. The PUCCH occupies a pair of RBs at both ends of the data region on a frequency axis and the RB pair frequency-hops over a slot boundary.

The PUCCH may deliver the following control information.

Scheduling request (SR): information requesting UL-SCH resources. An SR is transmitted in On-Off Keying (OOK).

HARQ ACK/NACK: a response signal to a DL data packet received on a PDSCH, indicating whether the DL data packet has been received successfully. A 1-bit ACK/NACK is transmitted as a response to a single DL codeword and a 2-bit ACK/NACK is transmitted as a response to two DL codewords.

CSI (Channel Status Information): feedback information regarding a DL channel. CSI includes a CQI and Multiple Input Multiple Output (MIMO)-related feedback information includes an RI, a PMI, a Precoding Type Indicator (PTI), etc. The CSI occupies 20 bits per subframe.

Table 5 below illustrates a mapping relationship between PUCCH formats and UCI in the LTE system.

TABLE 5

| PUCCH format | Uplink Control Information, UCI |
|---|---|
| Format 1 | SR(Scheduling Request) (un-modulated waveform) |
| Format 1a | 1-bit HARQ ACK/NACK (with/without SR) |
| Format 1b | 2-bit HARQ ACK/NACK (with/without SR) |
| Format 2 | CSI (20 coded bits) |

TABLE 5-continued

| PUCCH format | Uplink Control Information, UCI |
|---|---|
| Format 2 | CSI and 1/2-bit HARQ ACK/NACK (20 bits) (Extended CP only) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3(LTE-A) | HARQ ACK/NACK + SR (48 bits) |

Figure 10:
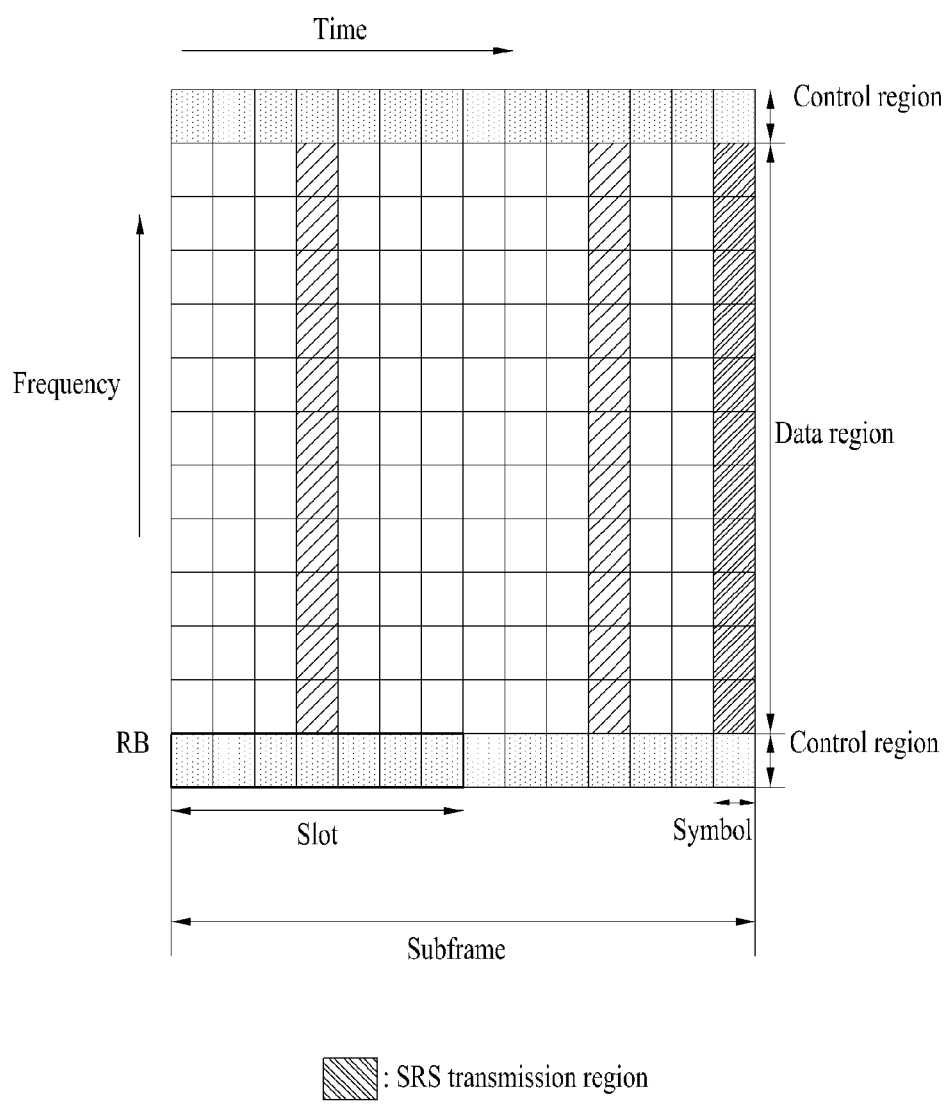
FIG. 10 is a diagram for an example of a reference signal used for an uplink subframe in LTE system.

FIG. 10 is a diagram for an example of a reference signal used for an uplink subframe in LTE system.

Figure 11:
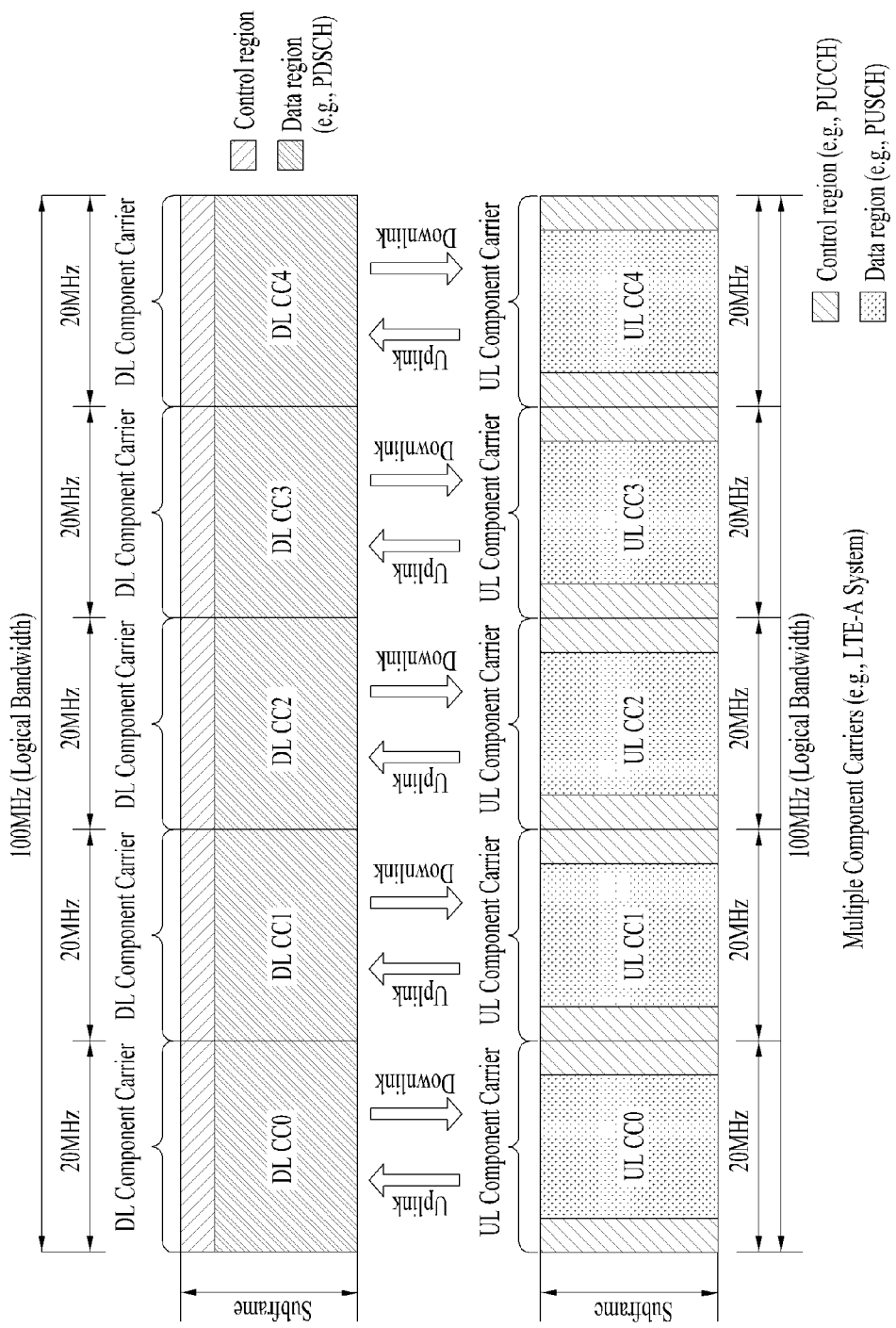
FIG. 11 illustrates an example of a carrier aggregation (CA) communication system.

Referring to FIG. 10, a user equipment can periodically or non-periodically transmit an SRS (sounding reference signal) to estimate a channel for an UL band (sub band) except a band on which PUSCH is transmitted or obtain information on a channel corresponding to a whole UL bandwidth (wide band). In case of periodically transmitting the SRS, a period can be determined via an upper layer signal. In case of non-periodically transmitting the SRS, a base station can indicate the transmission of the SRS using an 'SRS request' field of an UL-DL DCI format on PDCCH or trigger the transmission of the SRS using a triggering message. In case of a non-periodic SRS, a user equipment can transmit the SRS only when the SRS is indicated via PDCCH or a triggering message is received. As shown in FIG. 11, a region capable of receiving an SRS in a subframe corresponds to a period at which an SC-FDMA symbol, which is located at the last of a time axis in the subframe, is situated. In case of a TDD special subframe, an SRS can be transmitted via UL period (e.g., UpPTS). In case of a subframe configuration allocating a single symbol to UL period (e.g., UpPTS), an SRS can be transmitted via the last symbol. In case of a subframe configuration allocating 2 symbols, an SRS can be transmitted via the last one or two symbols. SRSs of many user equipments transmitted to the last SC-FDMA of an identical subframe can be distinguished from each other according to a frequency position. Unlike PUSCH, an SRS does not perform DFT (discrete Fourier Transform) calculation used for converting into SC-FDMA and the SRS is transmitted without using a precoding matrix which is used by PUSCH.

Moreover, a region to which a DMRS (demodulation reference signal) is transmitted in a subframe corresponds to a period at which an SC-FDMA symbol, which is located at the center of each slot in a time axis, is situated. Similarly, the DMRS is transmitted via a data transmission band on a frequency axis. For instance, the DMRS is transmitted in a $4^{th}$ SC-FDMA symbol and an $11^{th}$ SC-FDMA symbol in a subframe to which a normal cyclic prefix is applied.

Next, system information is explained. System information includes necessary information that UE needs to know to access a base station. Thus, UE need to receive all system information before accessing the base station and maintain latest system information all the time. Since all UEs in a cell need to know system information, a base station periodically transmits the system information. System information is classified into master information block (MIB), scheduling block (SB), system information block (SIB). MIB includes information about physical configuration of a corresponding cell such as bandwidth. SB includes transmission information such as a transmission period of SIBs. SIB is collection of system information relevant to each other. For example, some SIB includes information about neighboring cell only, and other SIB includes information about uplink radio channel used by UE. A base station transmits a paging channel in order to inform UE of whether system information has been changed. In this case, a paging message includes an indicator for system information change. When UE receives the paging message, if the paging message includes the indicator for system information change, UE receives system information via a logical channel BCCH.

FIG. 11 illustrates an example of a carrier aggregation (CA) communication system.

Referring to FIG. 11, it is able to support a wider UL/DL bandwidth in a manner of collecting a plurality of UL/DL component carriers (CCs). A technology of collecting and using a plurality of the component carriers is called a carrier aggregation or bandwidth aggregation. A component carrier can be comprehended as a carrier frequency (or center carrier, center frequency) for a corresponding frequency block. Each of a plurality of the component carriers can be adjacent or non-adjacent to each other in frequency domain. A bandwidth of each component carrier can be independently determined. It may configure an asymmetrical carrier aggregation of which the number of UL CCs is different from the number of DL CCs. For instance, there are 2 DL CCs and 1 UL CC, asymmetrical carrier aggregation can be configured in a manner that the DL CC corresponds to the UL CC by 2:1. A link between a DL CC and an UL CC is fixed in a system or can be semi-statically configured. Although a whole system band consists of N number of CCs, a frequency band capable of being monitored/received by a specific user equipment can be restricted to M (≤N) number of CCs. Various parameters for carrier aggregation can be configured by a cell-specific, a UE group-specific or a UE-specific scheme.

Meanwhile, control information can be configured to be transmitted/received on a specific CC only. This sort of specific CC is called a primary CC (PCC) and the rest of CCs are called a secondary CC (SCC). The PCC can be used for a user equipment to perform an initial connection establishment process or a connection re-establishment process. The PCC may correspond to a cell indicated in a handover process. The SCC can be configured after an RRC connection is established and can be used to provide an additional radio resource. As an example, scheduling information can be configured to be transmitted/received via a specific CC only. This sort of scheduling scheme is called cross-carrier scheduling (or cross-CC scheduling). If the cross-CC scheduling is applied, PDCCH for DL assignment is transmitted on a DL CC #0 and corresponding PDSCH can be transmitted on a DL CC #2. The term "component carrier" may be replaced with a different equivalent terminology such as a carrier, a cell or the like.

PCC may be used for a base station to exchange traffic and control signaling with UE. Control signaling may include addition of CC, configuration for PCC, configuration for discontinuous reception (DRX), uplink (UL) grant, or downlink (DL) grant etc. A plurality of PCCs may be used in a base station, while UE attached to the base station may be configured to have one PCC. If UE operates in a single carrier mode, the UE uses PCC. Thus, PCC may be configured to meet all the requirements of data and control signaling between a base station and UE such that PCC is independently employed.

Meanwhile, SCC may be activated or deactivated according to data throughput to be transmitted/received. SCC may be configured to be used according to specific instruction and rule received from a base station. Furthermore, SCC may used along with PCC in order to support addition bandwidth.

Resource allocation for UE may be made in a range of PCC and a plurality of SCCs. In carrier aggregation mode, a system may allocate SCC to UE asymmetrically in uplink and/or downlink, based on system load (i.e. static/dynamic load balancing), peak data rate, or service quality requirement.

In case that a plurality of CCs are carrier-aggregated, configuration for the plurality of CCs are provided from a base station to UE after an RRC connection procedure. The RRC connection means that UE is allocated with a radio resource based on RRC signaling exchanged through SRB between RRC layers of UE and a network. After a RRC connection procedure between UE and a base station, UE may receive configuration information about PCC and SCC from a base station. Configuration information for SCC may include addition/removal (or activation/deactivation) of SCC. Thus, communication of RRC signaling and MAC control element needs to be performed between a base station and UE in order to activate SCC or deactivate an existing SCC.

Figure 12:
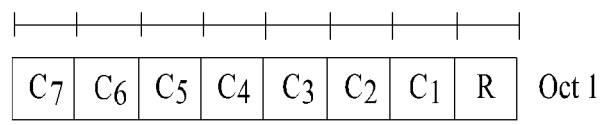
FIG. 12 illustrates an activation/deactivation MAC message used for LTE-A system.

FIG. 12 illustrates an activation/deactivation MAC message used for LTE-A system.

The activation/deactivation MAC message is identified by MAC packet data unit (PDU) subheader with logical channel ID (LCID) of binary number "11011". The activation/deactivation MAC message may include seven C-fields and one R-field, and may have a fixed size (e.g. 1 byte or 1 octet). In FIG. 12, C-field is illustrated as Ci and R-field is illustrated as R.

Ci: indicates activation/deactivation status of Scell with Scell index i. If there is no Scell with Scell index i, UE may ignore Ci field. For example, in case that Ci field is configured to be 1, Ci may indicate activation of Scell with Scell index i. In case that Ci field is configured to be 0, Ci may indicate deactivation of Scell with Scell index i. Ci may be used to activate/deactivate a plurality of Scells.

R: indicates a reserved field, and may be configured to be 0.

Figure 13:
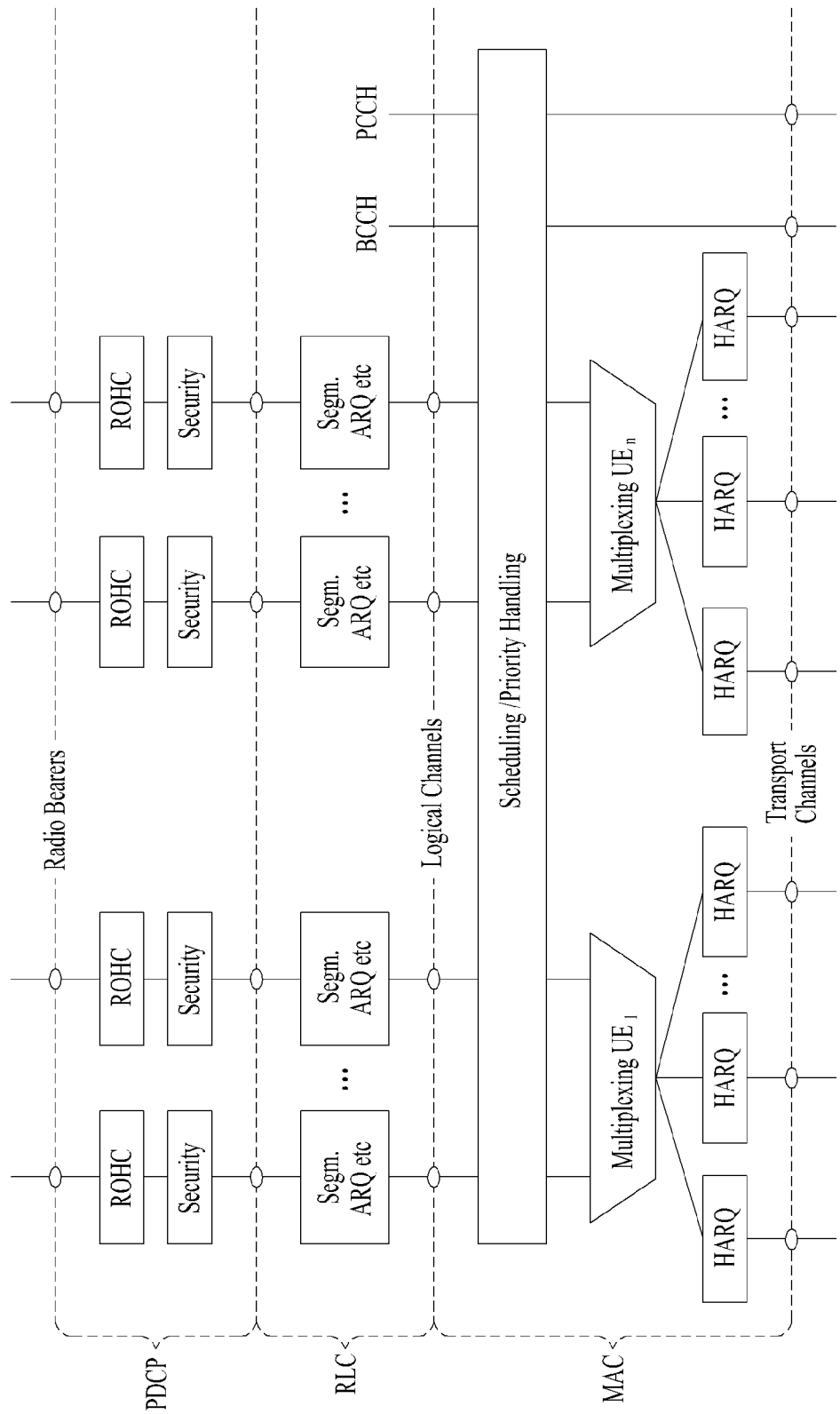
FIGS. 13 and 14 illustrate a structure of L2 (the second layer) in consideration of carrier aggregation.
Figure 14:
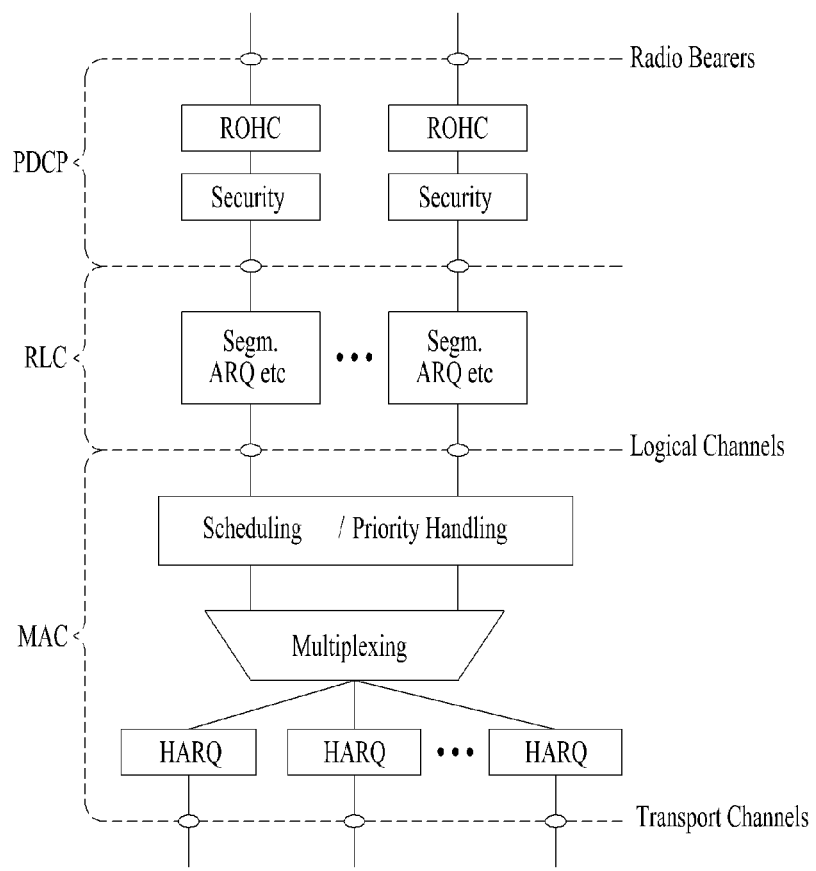

If an activation/deactivation message indicates activation of a specific Scell, UE may activate the specific cell through a procedure including the following operations:
  transmitting SRS on the Scell
  reporting CQI/PMI/RI/PTI on the Scell
  monitoring PDCCH on the Scell
  monitoring PDCCH on the Scell If an activation/deactivation message indicates deactivation of a specific Scell, UE may deactivate the specific cell through a procedure including the following operations:
  flushing all HARQ buffers related to the Scell
  not transmitting SRS on the Scell
  not reporting CQI/PMI/RI/PTI on the Scell
  not transmitting UL-SCH on the Scell
  not monitoring PDCCH on the Scell
  not monitoring PDCCH on the Scell FIGS. 13 and 14 illustrate a structure of L2 (the second layer) in consideration of carrier aggregation. FIG. 13 illustrates a downlink L2 (the second layer) structure in carrier aggregation, and FIG. 14 illustrates an uplink L2 (the second layer) structure in carrier aggregation.

PDCP, RLC, and MAC layers are illustrated in the downlink L2 structure in FIG. 13. In FIG. 13, the element represented by a circle in interfaces between respective layers denotes a service access point (SAP) for peer-to-peer communication. The SAP between PHY channel (not shown) and a RLC layer provides a transport channel, the SAP between a MAC layer and a RLC layer provides a logical channel. A general function of each layer is same as explained above.

The MAC layer multiplexes a plurality of logical channels (i.e., radio bearers) from the RLC layer. In the downlink L2 structure, a plurality of multiplexing entities in the MAC layer relates to applying a multiple input multiple output (MIMO) technique. In a system where carrier aggregation scheme is not applied, one transport channel is generated by multiplexing a plurality of logical channels in case non-MIMO, hence one hybrid automatic repeat and request (HARQ) entity is provided for one multiplexing entity (not shown).

Meanwhile, in a system in consideration of carrier aggregation scheme, a plurality of transport channels corresponding to a plurality of carriers are generated from one multiplexing entity. In this regard, one HARQ entity manages one carrier when carrier aggregation scheme is applied. Thus, a MAC layer in a system supporting carrier aggregation scheme provides a plurality of HARQ entities for one multiplexing entity, and performs relevant operations. Furthermore, since each HARQ entity processes transport blocks independently, a plurality of transport blocks may be simultaneously transmitted through a plurality of carriers.

In the uplink L2 structure of FIG. 14, the same operation as the downlink L2 structure of FIG. 13 is performed except that one MAC layer includes one multiplexing entity. That is, a plurality of HARQ entities can be provided for a plurality of carriers, operations related to a plurality of HARQ entities can be performed in a MAC layer, and a plurality of transport blocks can be simultaneously communicated on a plurality of carriers.

There exists a HARQ entity managing a HARQ operation in a MAC layer of UE, and the HARQ entity manages a plurality (e.g. 8) of HARQ processes. A plurality of HARQ processes operates synchronously in time. That is, each HARQ process is synchronously allocated for every TTI. Furthermore, each of the plurality of HARQ processes has an independent HARQ buffer. Since HARQ processes are allocated synchronously in time as described above, HARQ processes are managed such that, when a HARQ entity receives PDCCH for initial transmission of specific data, a HARQ process related to the reception time (TTI) transmits the specific data. UE generates data in the format of MAC protocol data unit (PDU) according to UL scheduling information, and then stores in a HARQ buffer and transmits the MAC PDU to a base station at a transmission time. In case that HARQ NACK is transmitted from a base station for the MAC PDU, UE may retransmit the MAC PDU stored in the HARQ buffer at a time designated in the same manner or in a new manner.

Figure 15:
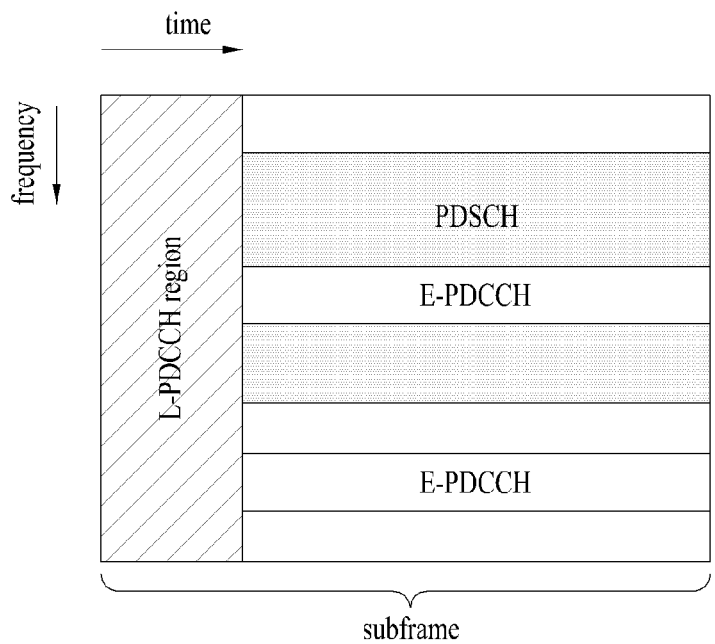
FIG. 15 illustrates E-PDCCH.

FIG. 15 illustrates E-PDCCH. As described with reference to FIGS. 7 and 8, the first n OFDM symbols of FDD DL carrier and TDD DL subframe in LTE(-A) system are used for transmission of PDCCH, PHICH, PCFICH etc carrying various control information and remaining OFDM symbols are used for PDSCH transmission. The number of symbols used for transmission of control channels in each subframe is signaled to UE dynamically via physical channel such as PCFICH or semi-statically via RRC signaling. The value n may be configured as 1 symbol up to 4 symbols according to subframe and system characteristics (FDD/TDD, system bandwidth etc). Meanwhile, in LTE(-A) system, PDCCH carrying DL/UL scheduling and various control information is restricted to be transmitted in a limited number of OFDM symbols. Thus, enhanced PDCCH (E-PDCCH), in which PDCCH and PDSCH are more freely multiplexed in FDM manner, is introduced in LTE(-A) and post LTE(-A) system (e.g. a system in accordance with 3GPP TS 36 series release-11 and thereafter).

Referring to FIG. 15, PDCCH (for clarity, legacy PDCCH (L-PDCCH)) used in LTE (-A) system can be assigned to a control region (refer to FIG. 4 and FIG. 5) of a subframe. In the drawing, an L-PDCCH region corresponds to a region to which a legacy PDCCH is capable of being assigned. According to a context, the L-PDCCH region may correspond to a control region, a control channel resource region (i.e., CCE resource) to which PDCCH is capable of being actually assigned in the control region or a PDCCH search space. Meanwhile, PDCCH can be additionally assigned to a data region (e.g., a resource region for PDSCH, refer to FIG. 4 and FIG. 5). The PDCCH assigned to the data region is called E-PDCCH. As shown in FIG. 14, if a control channel resource is additionally secured by E-PDCCH, scheduling limitation resulted from a limited control channel resource of L-PDCCH region can be mitigated.

Specifically, E-PDCCH can be detected and demodulated based on a DM-RS. E-PDCCH may have a structure of being transmitted over a PRB pair on a time axis. More specifically, a search space (SS) to detect E-PDCCH can consist of one E-PDCCH candidate set or a plurality of E-PDCCH candidate sets (e.g., 2 E-PDCCH candidate sets). Each of a plurality of the E-PDCCH sets can occupy a plurality of PRB pairs (e.g., 2, 4 and 8 PRB pairs). E-CCE (enhanced CCE) including the E-PDCCH sets can be mapped in a localized or distributed form (according to whether one E-CCE is distributed to a plurality of the PRB pairs). And, in case that E-PDCCH-based scheduling is configured, it is able to designate a subframe in which E-PDCCH transmission/detection is performed. E-PDCCH can be configured in an USS only. A user equipment makes an attempt at detecting DCI in an L-PDCCH CSS and an E-PDCCH USS only in a subframe (hereinafter E-PDCCH subframe) in which the E-PDCCH transmission/detection is configured. On the contrary, the user equipment can make an attempt at detecting DCI in the L-PDCCH CSS and an L-PDCCH USS in a subframe (non-E-PDCCH) in which E-PDCCH transmission/detection is not configured.

In case of E-PDCCH, an USS can include K number of E-PDCCH set(s) (according to each CC/cell) in terms of a single user equipment. In this case, the K is equal to or greater than 1 and may become a number equal to or less than a specific upper limit (e.g., 2). And, each of the E-PDCCH sets can include N number of PRBs (belonging to a PDSCH region). In this case, a value of the N and a PRB resource/index constructing the value of the N can be independently (i.e., set-specifically) assigned according to E-PDCCH set. Hence, the number of E-CCE resources and indexes of the E-CCE resources constructing each E-PDCCH set can be (UE-specifically) set-specifically configured. A PUCCH resource/index linked to each of the E-CCE resources/indexes can also be (UE-specifically) set-specifically assigned by configuring an independent start PUCCH resource/index according to an E-PDCCH set. In this case, E-CCE may indicate a basic control channel unit of E-PDCCH consisting of a plurality of REs (belonging to a PRB in a PDSCH region). The E-CCE may have a different structure according to E-PDCCH transmission form. As an example, E-CCE for localized transmission can be configured using REs belonging to an identical PRB pair. On the contrary, E-CCE for distributed transmission can be configured using REs extracted from a plurality of PRB pairs. Meanwhile, in case of the E-CCE for localized transmission, an antenna port (AP) can be independently used according to E-CCE resource/index to perform optimized beamforming for each user. On the contrary, in case of the E-CCE for distributed transmission, in order for a plurality of users to commonly use an antenna port, an identical antenna port set can be repeatedly used by E-CCEs different from each other.

Similar to L-PDCCH, E-PDCCH carries DCI. For instance, E-PDCCH can carry DL scheduling information and UL scheduling information. E-PDCCH/PDSCH process and E-PDCCH/PUSCH process are identical or similar to what is explained with reference to S407 and S408 of FIG. 4. In particular, a user equipment receives E-PDCCH and can receive data/control information on PDSCH corresponding to the E-PDCCH. And, a user equipment receives E-PDCCH and can transmit data/control information on PUSCH corresponding to the E-PDCCH. Meanwhile, LTE (-A) system is choosing a scheme that PDCCH candidate region (hereinafter PDCCH search space) is reserved in advance within a control region and PDCCH of a specific user equipment is transmitted to a partial region of the PDCCH search space. By doing so, a user equipment can obtain PDCCH of the user equipment in the PDCCH search space via blind detection. Similarly, E-PDCCH can be transmitted over a part of reserved resources or all reserved resources as well.

Figure 16:
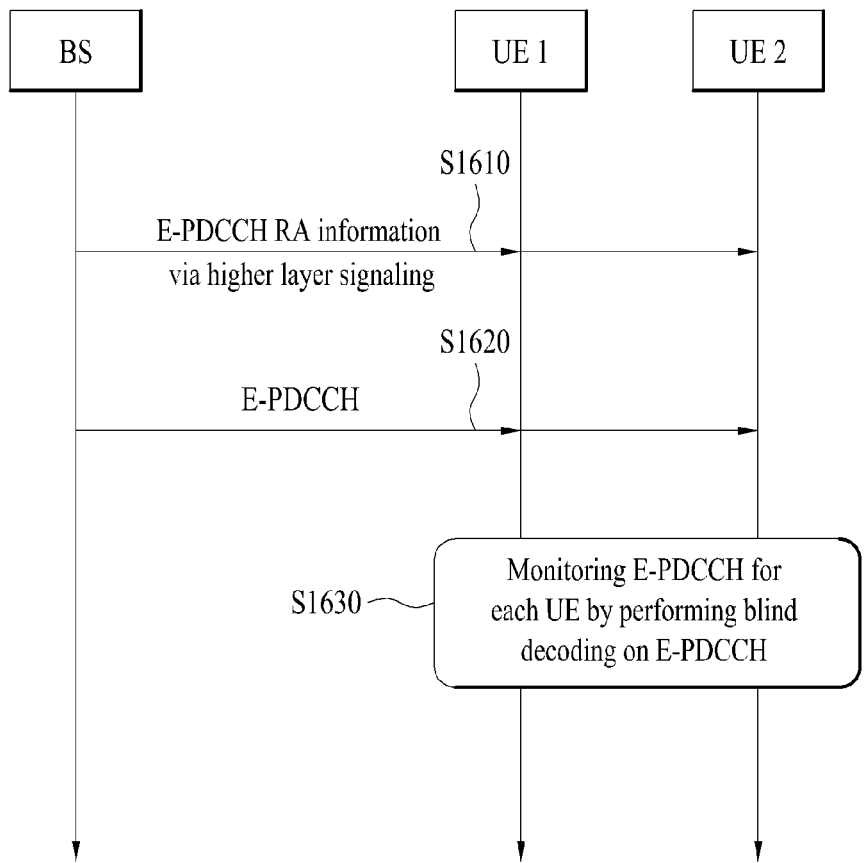
FIG. 16 illustrates an example of resource allocation for E-PDCCH and a process of receiving E-PDCCH.

FIG. 16 illustrates an example of resource allocation for E-PDCCH and a process of receiving E-PDCCH.

Referring to FIG. 16, a base station transmits E-PDCCH resource allocation (RA) information to a user equipment (S1410). The E-PDCCH resource allocation information can include RB (or VRB (virtual resource block)) allocation formation. The RB allocation information can be provided in an RB unit or an RBG (resource block group) unit. An RBG includes two or more contiguous RBs. The E-PDCCH resource allocation information can be transmitted using upper layer (e.g., radio resource control (RRC) layer) signaling. In this case, the E-PDCCH resource allocation information is used to reserve an E-PDCCH resource (region) in advance. Subsequently, the base station transmits E-PDCCH to the user equipment (S1420). The E-PDCCH can be transmitted in a partial region or all regions of the E-PDCCH resource (e.g., M number of RBs) reserved in S1410. Hence, the user equipment monitors a resource (region) (hereinafter E-PDCCH search space) to which the E-PDCCH is capable of being transmitted (S1430). The E-PDCCH search space can be provided by a part of the RB set allocated in S1410. In this case, monitoring includes a process of performing blind detection on a plurality of E-PDCCH candidates included in the search space.

Measurement/measurement report is explained hereinafter. Measurement report is performed for various methods ensuring a mobility of UE (handover, random access, cell search etc). Since coherent demodulation is required to some extent, measurement report is performed after UE acquires synchronization and physical layer parameters except for measurement of reception signal intensity. Measurement report includes radio resource management (RRM) such as reference signal receive power (RSRP), received signal strength indicator (RSSI), reference signal received quality (RSRQ) and further includes radio link monitoring (RLM) measurement which is used to measure link quality to a serving cell and evaluate radio link failure.

In relation to RRM, RSRP is a linear average of power distribution of RE for CRS transmission in downlink. RSSI is a linear average of total receiving power received by a corresponding UE and a measurement value including interference and noise power from a neighboring cell. If a specific subframe is indicated for RSRQ measurement via a higher layer signaling, RSSI is measured for all the OFDM symbols included in the specific subframe. RSRQ is a values measured in the format of N*RSRP/RSSI, where N is the number of RBs in a corresponding bandwidth at the time of RSSI measurement.

RLM is performed for UE to monitor a downlink quality of its serving cell in downlink and decide 'in-sync' or 'out-of-sync' for the corresponding cell. In this case, RLM is performed based on CRS. The downlink quality estimated by UE is compared with 'in-synch threshold (Qin)' and 'out-of-sync threshold (Qout)'. These thresholds are represented as PDCCH block error rate (BLER) of a serving cell. In particular, Qout and Qin are values corresponding to 10% and 2% BLER, respectively. Actually, Qin and Qout correspond to SINR of received CRS. If SINR of received CRS is higher than a certain level (Qin), UE determines to attach to a corresponding cell. If of received CRS is lower than a certain level (Qout), radio link failure (RLF) is declared.

Meanwhile, in LTE(-A) system, CRS and a control channel such as PCFICH/PDCCH/PHICH (in the first few OFDM symbol(s)) may be transmitted in all the downlink subframes for a carrier (except for a downlink subframe configured for a specific purpose (for example, MBSFN (Multicast Broadcast Single Frequency Network)). This may assure backward compatibility for access of UE and service provision. On the other hand, the next system (e.g. 3GPP technical specification (TS) 36 series release 11 and thereafter) may introduce a new type of carrier on which some or all of legacy signals/channels are not transmitted for the purpose of inter-cell interference improvement, carrier extension enhancement, advanced features (e.g. 8Tx MIMO). For convenience, a new type of carrier is referred to as a new carrier type (NCT). In contrast, a carrier type used in LTE(-A) system is referred to as a legacy carrier type (LCT). In the present specification, LTE(-A) system may refer to a system in accordance with 3GPP technical specification (TS) 36 series release 8, 9, 10.

In view of reference signal transmission, LCT carrier may carry fixed CRS transmission through the entire band in at least some of the first OFDM symbols. However, the fixed CRS transmission having high density may be skipped or reduced to a large extent on NCT carrier. CRS transmitted on NCT carrier may have the same configuration as CRS of LCT carrier, or may have similar configuration as CRS of LCT carrier, or may be newly defined for NCT carrier. Furthermore, in NCT carrier, Dl resources can be efficiently used by enhancing DL receiving performance and minimizing RS overhead through DL data reception based on UE-specific DM-RS and channel status measurement based on (configurable) channel status information RS (CSI-RS) having relatively low density.

As described above, LTE-A system may support aggregation (or carrier aggregation) of a plurality of cells, UE may perform parallel data communication via a plurality of cells allocated to itself. More specifically, UE performs initial access to a specific cell through cell search, and establishes a connection with eNB through a sequence of command/message communication operations. A cell used to establish a connection with eNB may be referred to as a primary cell (or Pcell). Then, UE may perform RRM measurement procedure, and may be additionally assigned with a specific cell having a good quality of receiving signals in a UE-specific manner via a higher layer signaling (e.g. RRC signaling) base on the result of RRM measurement procedure. Additionally assigned specific cell may be referred to as a secondary cell (or Scell). UE may perform CA based operations on Pcell and Scell. Then, UE may perform periodic RRM measurement, and, when a receiving signal quality gets worse in an assigned Scell, the assigned Scell may be released in a UE-specific manner via a higher layer signaling (e.g. RRC signaling). When Scell is released, UE may perform single cell based operations in Pcell only. In the above-described procedure, one or more Scells may be assigned.

Scell may be activated/deactivated in a UE-specific manner via MAC signaling according to channel status or for the purpose of saving UE power. Even when Scell is deactivated, Scell remains in a state of being assigned or being carrier-aggregated for UE from the perspective of a higher layer (e.g. RRC). As described above, when Scell is deactivated, UE may perform at least one operation of the followings:

- does not monitor PDCCH on the deactivated Scell and/or for the deactivated Scell. For example, UE does not transmit UL-SCH on the deactivated Scell, and does not monitor PDSCH on the deactivated Scell. In other words, UE stops UL-SCH transmission on the deactivated Scell, and stops PDSCH monitoring on the deactivated Scell.
- flush all HARQ buffers related to the deactivated Scell.
- does not report CSI for the deactivated Scell. For example, UE does not report channel quality information (CQI)/precoding matrix index (PMI)/rank indicator (RI)/precoding type indicator (PTI) etc for the deactivated Scell. In other words, UE stops reporting CQI/PMI/RI/PTI for the deactivated Scell.
- does not transmit sounding reference signal (SRS) on the deactivated Scell. In other words, UE stops transmitting sounding reference signal (SRS) on the deactivated Scell.

Meanwhile, Scell may be activated in the deactivated state. When Scell is activated, UE may perform operations which were stopped in the deactivated state. For example, UE may monitor PDCH on the activated Scell and/or for the activated Scell, may transmit UL data or receive DL data on the activated Scell, may transmit SRS to eNB on the activated Scell, or may resume or perform CSI reporting for the activated Scell.

Figure 17:
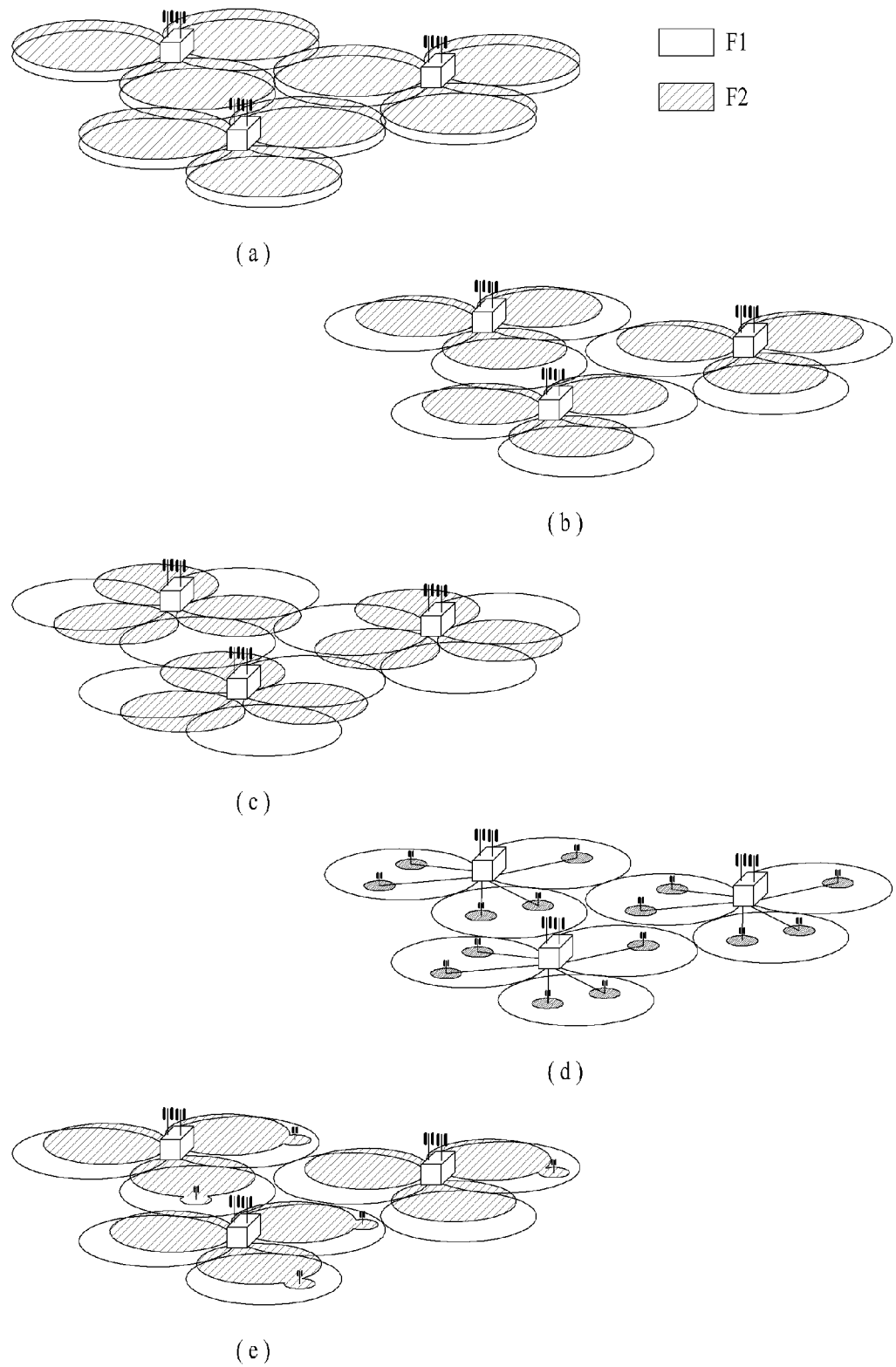
FIG. 17 illustrates an example of deployment scenario of cells for carrier aggregation.

FIG. 17 illustrates an example of deployment scenario of cells for carrier aggregation. In LTE-A system or post LTE-A system, a plurality of cells having can be aggregated with various coverages or on various locations. In examples of FIG. 17, carrier aggregation may be available for overlapped cells (e.g. F1 and F2).

With reference to FIG. 17(a), a first cell (e.g. F1) and a second cell (e.g. F2) cells may be co-located and overlapped. In this case, a first cell (e.g. F1) and a second cell (e.g. F2) may provide almost same coverage.

With reference to FIG. 17(b), a first cell (e.g. F1) and a second cell (e.g. F2) cells may be co-located and overlapped. However, a second cell (e.g. F2) has smaller coverage than that of a first cell (e.g. F1) due to difference in path loss. Thus, only a first cell (e.g. F1) may provide sufficient coverage.

With reference to FIG. 17(c), a first cell (e.g. F1) and a second cell (e.g. F2) cells may be co-located but an antenna direction for a second cell (e.g. F2) may be directed to a cell edge. In this case, throughput in the cell edge may be increase. A first cell (e.g. F1) may provide sufficient coverage, while a second cell (e.g. F2) may potentially have a hole.

With reference to FIG. 17(d), a first cell (e.g. F1) may provide for example a macro coverage and a second cell (e.g. F2) may provide for example a limited coverage through a Remote Radio Head (RRH) (e.g. repeater). A second cell (e.g. F2) may be used to enhance throughput in a hot spot. eNB and RRH may be connected by wire or in wireless.

With reference to FIG. 17(e), similar to the example of FIG. 17(b), but a frequency selective repeater us deployed so that a coverage of a second cell (e.g. F2) may be extended.

In case of examples of FIG. 17(b) to FIG. 17(e), serving cells a first cell (e.g. F1) and a second cell (e.g. F2) may have different frequency characteristics. Thus, maintenance of multiple timing advances and multiple timing advance groups may be needed for the examples of FIG. 17(b) to FIG. 17(e).

As shown in FIG. 17, it may consider environment in which a plurality of cells of small coverage (e.g., micro cell) are deployed in a cell of big coverage (e.g., macro cell) in a manner of being mixed for traffic optimization and the like in a next system after LTE-A system. In the environment, it may consider performing carrier aggregation (CA) of a macro cell and a micro cell. In this case, since the macro cell (e.g., F1) provides sufficient coverage, the macro cell can be managed as a Pcell for the purpose of mobility management for example. On the contrary, since the micro cell (e.g., F2) provides limited coverage, the micro cell can be managed as a Scell for the purpose of throughput boosting for example. And, a plurality of micro cells may form a cluster of a concentrated form in such a limited area as a hot spot, indoor and the like. A plurality of the micro cells belonging to the concentrated cluster may perform a series of interference coordination (IC)/interference management (TM) processes to control and coordinate an impact of interference. In this case, a specific micro cell may give a dominant impact to inter-cell interference and may act as a dominant cause of deterioration of resource utilization efficiency due to the IC (interference coordination)/IM (interference management). In this case, in terms of an eNB, it may be more profitable and efficient to stop all operations of the micro cell and compensate coverage of the micro cell by applying an appropriate scheme rather than manage the macro cells by performing the inefficient IC (interference coordination)/IM (interference management). For instance, the eNB can release the micro cell from all UEs by turning off the micro cell causing a dominant interference. And, for instance, the eNB can compensate coverage of the turned off micro cell by applying such a scheme as CRE (cell range expansion) and the like to cells adjacent to the turned off micro cell. In case of turning off the micro cell causing the dominant interference, it may profitable for power saving of the eNB as well.

In a legacy LTE (-A) system, in order to turn off a micro cell causing a dominant interference (or, in order to release the micro cell from all UEs), a scheme of directly releasing the cell can be applied by individually performing UE-specific RRC signaling for each UE. Yet, in case of individually turning off the cell for each UE using a UE-specific scheme, a burden resulted from signaling overhead and signaling latency may be huge. For instance, in the legacy LTE (-A) system, RRC reconfiguration and a confirmation process are carried to individually turn off a cell for each UE. This sort of RRC signaling may have a larger amount of data and latency in millisecond unit. Hence, to individually perform the RRC signaling for all UEs belonging to the cell to be turned off may become a big burden.

As a different method capable of being implemented in the legacy LTE (-A) system, in order to more promptly turn off a micro cell causing a dominant interference, the cell is deactivated by individually performing UE-specific MAC signaling for each UE and then the cell can be released by individually performing UE-specific RRC signaling for each UE again. Yet, this method also has possibility of aggravating such a burden as signaling overhead and signaling latency due to a traffic load of a Pcell (e.g., macro cell), UE load, channel state and the like.

The present invention proposes an efficient deactivation method enabling a cell operation to be more promptly terminated (off or release). As mentioned in the foregoing description, deactivation of a cell is carried out based on UE-specific MAC signaling in a legacy LTE-A. On the contrary, deactivation of a cell can be performed by cell-specific deactivation signaling or UE group-specific deactivation signaling in the present invention. According to the present invention, it is able to uniformly (commonly) indicate cell deactivation to a plurality of UEs configured to aggregate cells to be deactivated by the cell-specific deactivation signaling or UE group-specific deactivation signaling. Hence, according the present invention, it is able to uniformly indicate cell deactivation to UEs configured to perform CA for a cell to be deactivated. The cell deactivation can be performed via L1/L2 signaling (e.g., PDCCH, PDSCH or MAC command).

As an example, deactivation signaling (e.g., a deactivation message) according the present invention can be transmitted/received via a control channel (e.g., PDCCH) which is scrambled based on a cell-commonly or UE group commonly allocated common identifier (e.g., RNTI). Or, deactivation signaling (e.g., a deactivation message) according the present invention can be transmitted/received via a data channel (e.g., PDSCH) scheduled by a control channel (e.g., PDCCH), which is scrambled based on a common identifier (e.g., RNTI). The common identifier (e.g., RNTI) can commonly identify a plurality of UEs configured to aggregate cells to be deactivated.

In case of transmitting deactivation signaling (e.g., a deactivation message) according to the present invention via a control channel (e.g., PDCCH), the control channel (e.g., PDCCH) can be transmitted via a CSS (common search space) of a Pcell by which each UE is aggregated. Or, the control channel (e.g., PDCCH) can be transmitted via a CSS (common search space) of a deactivated cell. In case of transmitting the deactivation signaling (e.g., deactivation message) via a data channel (e.g., PDSCH), the data channel (e.g., PDSCH) can be transmitted in a Pcell by which each UE is aggregated or a deactivated cell.

In case of transmitting deactivation signaling (e.g., deactivation message) in a Pcell, UEs including an identical Pcell receive the deactivation signaling (e.g., deactivation message) at the same time via a single control channel (e.g., PDCCH), which is scrambled based on a common identifier (e.g., RNTI) via a common search space (CSS) of the Pcell. Or, the UEs can receive the deactivation signaling (e.g., deactivation message) at the same time via a data channel (e.g., PDSCH) scheduled by the control channel. And, in case of transmitting the deactivation signaling (e.g., deactivation message) in the Pcell, the deactivation signaling (e.g., deactivation message) can include a cell ID (identifier) value of a deactivated cell. A cell ID is an identifier uniquely identifying a specific cell and has an absolute value. On the contrary, when a plurality of cells are aggregated with each other, a cell index may exist as an identifier indicating each cell in the aggregated cells. The cell index is a relative value in the aggregated cells. Hence, if a specific cell is carrier-aggregated, although a cell ID value of the specific cell is constant, a cell index value of the specific cell may change in some cases. For instance, when a first cell and a second cell are carrier-aggregated, it is able to configure that the first cell has a cell index value of 0 and the second cell has a cell index value of 1 in a first UE. On the contrary, it is able to configure that the first cell has a cell index value of 1 and the second cell has a cell index value of 0 in a second UE. On the contrary, if specific cell ID values are given to the first cell and the second cell, respectively, the specific cell ID values are constant in all UEs.

In case of transmitting deactivation signaling (e.g., deactivation message) in a deactivated cell, UEs configured to perform CA (carrier aggregation) for the deactivated cell receive the deactivation signaling (e.g., deactivation message) at the same time via a single control channel (e.g., PDCCH), which is scrambled based on a common identifier (e.g., RNTI) via a common search space (CSS) of the deactivated. Or, the UEs can receive the deactivation signaling (e.g., deactivation message) at the same time via a data channel (e.g., PDSCH) scheduled by the control channel. Yet, when the deactivation signaling (e.g., deactivation message) according to the present invention is transmitted in the deactivated cell, since each UE already knows the deactivated cell, it is not necessary for an eNB to inform each UE of cell identification information via the deactivation signaling (e.g., deactivation message). Hence, in this case, the deactivation signaling (e.g., deactivation message) may not include a cell ID or a cell index value of the deactivated cell.

On the contrary, in the legacy LTE-A system, deactivation signaling (e.g., deactivation message) is transmitted via UE-specific MAC signaling. Hence, the deactivation signaling (e.g., deactivation message) of the legacy system is transmitted via PDSCH scheduled by PDCCH, which is scrambled by C-RNTI unique for each UE. Since PDCCH is specific to each UE, PDCCH is transmitted via a UE-specific search space (USS).

For instance, a control channel carrying deactivation signaling (e.g., deactivation message) according to the present invention may include an L-PDCCH and an E-PDCCH. And, a common search space (CSS) configured to detect a control channel can also be configured based on an L-PDCCH scheme and an E-PDCCH scheme according to the present invention.

When a UE receives deactivation signaling (e.g., deactivation message) according to the present invention, each UE can perform operations supposed to be performed when a deactivation MAC message according to a legacy LTE-A system is received. Hence, in case of receiving the deactivation signaling (e.g., deactivation message) according to the present invention, each UE may perform at least one of the following operations.

A UE does not monitor PDCCH in a deactivated cell and/or for the deactivated cell. For instance, a UE does not perform an operation detecting PDCCH including a UL grant or a DL grant in the deactivated cell and/or for the deactivated cell.

A UE does not transmit UL data or does not receive DL data in a deactivated cell. For instance, a UE does not transmit UL-SCH.

A UE flushes all HARQ buffers related to a deactivated cell.

A UE does not report CSI on a deactivated cell. For instance, a UE does not report CQI, PMI, RI, PTI and the like on a deactivated Scell to an eNB.

A UE does not transmit an SRS in a deactivated cell.

Yet, each UE can continuously perform RRM measurement to monitor downlink signal quality for a deactivated cell. Since the continuous RRM measurement may increase power consumption of each UE, the present invention proposes to stop measuring RRM for the deactivated cell except the aforementioned operations. Hence, in case of receiving deactivation signaling according to the present invention, each UE can stop the RRM measurement operation without any separate signaling. The deactivation signaling according to the present invention can inform a deactivated cell of whether the RRM measurement operation is maintained or terminated. An indication/command for the RRM measurement operation can be identically applied to not only a deactivation signaling scheme according to the present invention but also a legacy UE-specific MAC signaling scheme.

Figure 18:
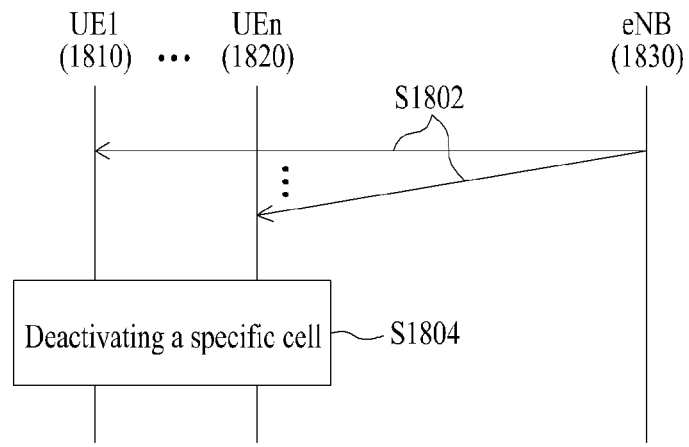
FIG. 18 is a flowchart for a method of transmitting and receiving deactivation signaling according to the present invention.

FIG. 18 is a flowchart for a method of transmitting and receiving deactivation signaling according to the present invention. In an example shown in FIG. 18, although an eNB 1830 is depicted, the eNB 1830 is not limited to an eNode B only. The eNB can be replaced with a different transmission point (TP). For instance, in case that the eNB 1830 corresponds to such a TP as an RRH or a repeater shown in FIG. 17, the present invention can also be identically applied.

In S1802, the eNB 1830 can transmit a signal (or deactivation signaling) indicating deactivation of a specific cell to a plurality of UEs 1810/1820 configured to aggregate the specific cell. As mentioned in the foregoing description, the signal can commonly indicate the deactivation of the specific cell to a plurality of the UEs 1810/1820 configured to aggregate the deactivated cell. For instance, the deactivated cell may include a Scell. And, as described in the following, the eNB 1830 can signal at least one or more cells to be deactivated.

In S1802, as mentioned in the foregoing description, the signal indicating the deactivation can be transmitted/received via a control channel (e.g., PDCCH), which is scrambled by an identifier (e.g., RNTI) common to a plurality of the UEs 1810/1820 configured to aggregate the deactivated cell. In this case, a plurality of the UEs 1810/1820 can receive the signal indicating the deactivation by detecting the control channel (e.g., PDCCH) scrambled by the common identifier (e.g., RNTI). Or, the signal indicating the deactivation can be received via a data channel (e.g., PDSCH) scheduled by the control channel (e.g., PDCCH), which is scrambled by the identifier (e.g., RNTI) common to a plurality of the UEs 1810/1820. In this case, a plurality of the UEs 1810/1820 can receive the signal indicating the deactivation by detecting the control channel (e.g., PDCCH) scrambled by the common identifier (e.g., RNTI) and decoding the data channel (e.g., PDSCH) scheduled by the control channel (e.g., PDCCH). The control channel related to transmission and reception of the signal indicating the deactivation may correspond to an L-PDCCH or an E-PDCCH.

And, in S1802, the signal indicating the deactivation can be transmitted/received via a Pcell (primary cell). In this case, the signal indicating the deactivation may include a cell ID value. Or, the signal indicating the deactivation can be transmitted/received via a deactivated cell itself. In this case, the signal indicating the deactivation does not need to include such cell identification information as a cell ID or a cell index.

In S1804, each of a plurality of the UEs 1810/1820 deactivates a cell indicated by the signal indicating the deactivation. As mentioned in the foregoing description, in case of deactivating a specific cell, each of a plurality of the UEs 1810/1820 can perform at least one operation selected from the group consisting of an operation not transmitting an SRS (sounding reference signal) in the specific cell, an operation not transmitting CQI (channel quality information), PMI (precoding matrix index) information, RI (rank indicator) information and PTI (precoding type indicator) on the specific cell, an operation not transmitting UL data in the specific cell, an operation not monitoring PDCCH in the specific cell and/or for the specific cell and an operation not performing RRM (radio resource management) measurement in the specific cell.

Meanwhile, an ACK/NACK transmission resource used for transmitting ACK/NACK feedback accompanied by deactivation signaling according to the present invention can be allocated in advance via upper layer signaling (e.g., RRC signaling) and the like. In this case, the ACK/NACK resource can be allocated irrespective of an ACK/NACK resource which is allocated in response to reception of a general DL data and can be differently allocated according to each UE. For instance, an ACK/NACK resource can be allocated for the purpose of ACK/NACK feedback only for the cell deactivation signaling. Or, a control channel (e.g., PDCCH) or a data channel (e.g., PDSCH) carrying the deactivation signaling according to the present invention may include ACK/NACK resource allocation information for the deactivation signaling. In this case, the ACK/NACK resource allocation information can include information on a resource used by each UE. Hence, the ACK/NACK transmission resource for the deactivation signaling can be set to a UE in advance via upper layer signaling or can be set to a UE via a control channel (e.g., PDCCH) or a data channel (e.g., PDSCH) carrying the deactivation signaling.

Meanwhile, a plurality of cells can be simultaneously deactivated at a time based on deactivation signaling according to the present invention. In case of a FDD system, a DL carrier or a UL carrier consisting of a single cell can be independently deactivated based on the deactivation signaling according to the present invention. In case of a TDD system, a DL subframe or a UL subframe can be independently deactivated based on the deactivation signaling according to the present invention.

As an example, when a cell #1 and a cell #2 are carrier-aggregated with each other in a FDD system, a DL carrier of the cell #1 can be deactivated only using the deactivation signaling according to the present invention. Or, all carriers (both a DL carrier and a UL carrier) of the cell #1 and a UL carrier of the cell #2 can be deactivated. As a different example, when a cell #3 and a cell #4 are carrier-aggregated with each other in a TDD system, a DL subframe of the cell #3 can be deactivated only using the deactivation signaling according to the present invention. Or, all subframes (both a DL and a UL subframe) of the cell #3 and a UL subframe of the cell #4 can be deactivated using the deactivation signaling according to the present invention.

In case of deactivating a UL carrier or a UL subframe using the deactivation signaling according to the present invention, it may omit transmission of a UL signal/channel transmitted via a UL carrier/subframe of a deactivated cell and relevant operation (e.g., UL grant PDCCH detection, PHICH reception). Or, it may operate in a state assuming that there is no scheduling/transmission for a UL signal/channel. In case of deactivating a DL carrier or a DL subframe using the deactivation signaling according to the present invention, it may omit reception/measurement of a DL signal/channel (e.g., PDCCH/PDSCH/CRS/CSI-RS) received via a DL carrier/subframe of a deactivated cell and relevant operation (e.g., DL grant PDCCH detection, HARQ-ACK transmission). Or, it may operate in a state assuming that there is no scheduling/transmission for a DL signal/channel. The aforementioned independent deactivation scheme for a DL/UL carrier (FDD) or a DL/UL subframe (TDD) can be identically applied to not only a case of receiving deactivation signaling according to the present invention but also a case of receiving a legacy UE-specific MAC signaling.

In the foregoing description, the present invention mainly concerns deactivation of a cell, by which the present invention may be non-limited. A method according to the present invention can be identically applied to activation of a cell. For instance, cell activation/deactivation signaling according to the present invention can indicate RRM measurement operation to be terminated or resumed. For instance, the cell activation/deactivation signaling according to the present invention can independently indicate activation/deactivation of a cell for a DL/UL carrier or a DL/UL subframe. (This can be supported by a legacy UE-specific MAC signaling as well). For instance, an ACK/NACK transmission resource for the cell activation/deactivation signaling according to the present invention can be allocated by signaling itself according to the present invention or a separate upper layer signaling (e.g., RRC signaling).

Signaling that indicates activation/deactivation of a specific cell according to the present invention can further include information on activation/deactivation duration. The information on the activation/deactivation duration may indicate time/duration of the specific cell maintained in an activated/deactivated state. Having received the information on the activation/deactivation duration, UEs can perform an operation coupled with an activation/deactivation state during the activation/deactivation duration only. The UEs can resume an operation coupled with a deactivation/activation state at the time of terminating the activation/deactivation duration. Or, the activation/deactivation duration can be configured via upper layer signaling (e.g., RRC signaling) and the like in advance. If signaling indicating activation/deactivation of a specific cell is received, the specific cell is activated or deactivated during the set duration and can be deactivated or activated again. The activation/deactivation scheme based on the activation/deactivation duration can also be identically applied to not only a case of receiving deactivation signaling according to the present invention but also a case of receiving a legacy UE-specific MAC signaling.

As a further different method, activation/deactivation of a specific cell can be cell-specifically or UE group-specifically indicated using a system information block (SIB) transmitted based on SI-RNTI or using a paging procedure of a UE group unit. For instance, the system information block (SIB) can include information configured to indicate activation/deactivation of a specific cell to UEs that includes a cell carrying an SIB as a Pcell. The UEs periodically check the SIB and can periodically check whether the specific cell is activated or deactivated. And, for instance, a paging message transmitted to UE group can include information configured to indicate activation/deactivation of a specific cell to UEs. The UEs periodically check a UE group becoming a target of paging and can periodically check whether the specific cell is activated or deactivated. As a different example, UEs configured to aggregate a specific cell set one or more UE groups and can uniformly indicate activation/deactivation of the specific cell to UEs belonging to a corresponding UE group using a paging message transmitted to the corresponding UE group.

Meanwhile, the present invention may be non-limited to a case that a macro cell and a micro cell are carrier-aggregated only. The present invention can be universally applied to not only a cell deployment environment shown in FIG. 17 but also a general cell deployment environment in which a similar problem may occur. As an example, in case of managing a cell type (e.g., NCT carrier) of a new structure, which is not backward compatible with a legacy LTE (-A) system (e.g., a cell-specific reference signal (RS) is not continuously transmitted in every DL subframe and the like), as a Scell, a method according to the present invention can be applied. In this case, a Pcell consists of an LCT carrier compatible with the legacy LTE (-A) system and the Scell can consist of an NCT carrier of a new structure. When the method according to the present invention is applied, since activation/deactivation is uniformly indicated for UEs configured to aggregate the Scell consisting of the NCT carrier, it may be efficient.

As a different example, the present invention can also be applied to a case of managing a cell randomly configured on an unlicensed band via competition with a homogeneous/heterogeneous system based on spectrum sensing and the like as a Scell. In this case, a Pcell is fixedly configured on a licensed band and the Scell can be temporarily configured on the unlicensed band. When the method according to the present invention is applied, since activation/deactivation is uniformly indicated for UEs configured to carrier-aggregate the Scell configured on the unlicensed band, it may be efficient.

Figure 19:
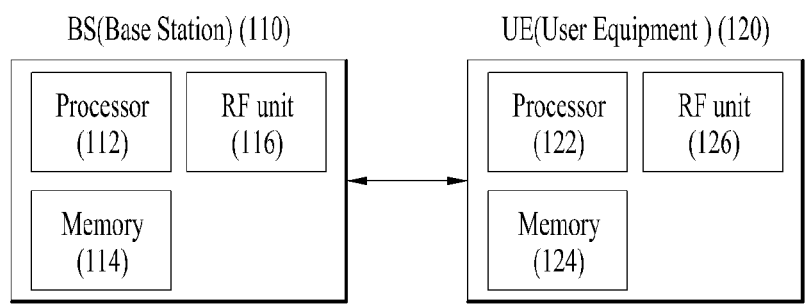
FIG. 19 illustrates a BS 110 and a UE 120 to which the present invention is applicable.

FIG. 19 illustrates a BS 110 and a UE 120 to which the present invention is applicable.

Referring to FIG. 19, a wireless communication system includes the BS 110 and the UE 120. When the wireless communication system includes a relay, the BS 110 or the UE 120 can be replaced with the relay.

The BS 110 includes a processor 112, a memory 114, and a radio frequency (RF) unit 116. The processor 112 may be configured to embody the procedures and/or methods proposed by the present invention. The memory 114 is connected to the processor 112 and stores various pieces of information associated with an operation of the processor 112. The RF unit 116 is connected to the processor 112 and transmits/receives a radio signal. The UE 120 includes a process 122, a memory 124, and an RF unit 126. The processor 122 may be configured to embody the procedures and/or methods proposed by the present invention. The memory 124 is connected to the processor 122 and stores various pieces of information associated with an operation of the processor 122. The RF unit 126 is connected to the processor 122 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

What is claimed is:

1. A method for receiving a control signal by a user equipment (UE) in a wireless communication system in which a plurality of cells are aggregated, the method comprising:
receiving a signal indicating deactivation of at least one cell among the plurality of the cells; and
deactivating the at least one cell,
wherein the signal indicating the deactivation commonly indicates the deactivation of the at least one cell to a plurality of UEs configured to aggregate the at least one cell, and
wherein the receiving the signal indicating the deactivation includes detecting a PDCCH scrambled with a radio network temporary identifier (RNTI) common to the plurality of UEs and receiving a physical downlink shared channel (PDSCH) scheduled by the PDCCH, and wherein the signal indicating the deactivation is received via the PDSCH.

2. The method of claim 1,
wherein when the signal indicating the deactivation is received on a primary cell other than the at least one cell, the signal indicating the deactivation includes a cell identifier (ID) value, and
wherein when the signal indicating the deactivation is received on each of the at least one cell, the signal indicating the deactivation does not include cell identification information.

3. The method of claim 1, wherein the deactivating the at least one cell includes stopping transmission of a sounding reference signal (SRS) on the at least one cell, stopping transmission of channel quality information (CQI), precoding matrix index (PMI) information, rank indicator (RI) information, and precoding type indicator (PTI) for the at least one cell, stopping monitoring of a PDCCH on the at least one cell and/or for the at least one cell, stopping monitoring of a PDSCH on the at least one cell, and stopping radio resource management (RRM) measurement for the at least one cell.

4. The method of claim 1, wherein when the wireless communication system is a frequency division duplex (FDD) system, the deactivating the at least one cell includes stopping an operation related to uplink signal transmission via an uplink carrier included in each of the at least one cell or stopping an operation related to downlink signal reception via a downlink carrier.

5. The method of claim 1, wherein when the wireless communication system is a time division duplex (TDD) system, the deactivating the at least one cell includes stopping an operation related to uplink signal transmission in an uplink subframe included in each of the at least one cell or stopping an operation related to downlink signal reception in a downlink subframe.

6. The method of claim 1, wherein the signal indicating the deactivation includes a cell-specific message or a UE group-specific message.

7. A user equipment (UE) for receiving a control signal in a wireless communication system in which a plurality of cells are aggregated, the UE comprising:
a radio frequency (RF) unit; and
a processor, the processor configured to receive a signal indicating deactivation of at least one cell among the plurality of cells through the RF unit, and deactivate the at least one cell,
wherein the signal indicating the deactivation commonly indicates the deactivation of the at least one cell to a plurality of UEs configured to aggregate the at least one cell, and
wherein the receiving the signal indicating the deactivation includes detecting a PDCCH scrambled with a radio network temporary identifier (RNTI) common to the plurality of UEs and receiving a physical downlink shared channel (PDSCH) scheduled by the PDCCH, and wherein the signal indicating the deactivation is received via the PDSCH.

8. The user equipment (UE) of claim 7,
wherein when the signal indicating the deactivation is received on a primary cell other than the at least one cell, the signal indicating the deactivation includes a cell identifier (ID) value, and
wherein when the signal indicating the deactivation is received on each of the at least one cell, the signal indicating the deactivation does not include cell identification information.

9. The user equipment (UE) of claim 7, wherein the deactivating the at least one cell includes stopping transmission of a sounding reference signal (SRS) on the at least one cell, stopping transmission of channel quality information (CQI), precoding matrix index (PMI) information, rank indicator (RI) information, and precoding type indicator (PTI) on the at least one cell, stopping monitoring of a PDCCH on the at least one cell and/or for the at least one cell, stopping monitoring of a PDSCH on the at least one cell, and stopping radio resource management (RRM) measurement for the at least one cell.

10. The user equipment (UE) of claim 7, wherein when the wireless communication system is a frequency division duplex (FDD) system, the deactivating the at least one cell includes stopping an operation related to uplink signal transmission via an uplink carrier included in each of the at least one cell or stopping an operation related to downlink signal reception via a downlink carrier.

11. The user equipment (UE) of claim 7, wherein when the wireless communication system is a time division duplex (TDD) system, the deactivating the at least one cell includes stopping an operation related to uplink signal transmission in a uplink subframe included in each of the at least one cell or stopping an operation related to downlink signal reception in a downlink subframe.

* * * * *